US008935728B2

(12) United States Patent
Stallings et al.

(10) Patent No.: US 8,935,728 B2
(45) Date of Patent: *Jan. 13, 2015

(54) PROGRAM GUIDE NAVIGATION TOOLS FOR MEDIA CONTENT ACCESS SYSTEMS AND METHODS

(71) Applicant: Verizon Patent and Licensing Inc., Arlington, VA (US)

(72) Inventors: Heath Stallings, Grapevine, TX (US); Brian Roberts, Frisco, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/950,665

(22) Filed: Jul. 25, 2013

(65) Prior Publication Data

US 2013/0312035 A1    Nov. 21, 2013

Related U.S. Application Data

(63) Continuation of application No. 11/614,644, filed on Dec. 21, 2006, now Pat. No. 8,510,780.

(51) Int. Cl.
| | | |
|---|---|---|
| G06F 13/00 | (2006.01) | |
| G06F 3/00 | (2006.01) | |
| H04N 5/445 | (2011.01) | |
| H04N 21/472 | (2011.01) | |
| H04N 21/443 | (2011.01) | |
| H04N 21/482 | (2011.01) | |
| H04N 5/44 | (2011.01) | |

(52) U.S. Cl.
CPC .... *H04N 5/44543* (2013.01); *H04N 2005/4412* (2013.01); *H04N 5/4403* (2013.01); *H04N 21/47214* (2013.01); *H04N 21/4438* (2013.01); *H04N 21/482* (2013.01)
USPC ................... 725/52; 725/39; 725/40; 725/43; 725/45

(58) Field of Classification Search
USPC .................................. 725/39–40, 43, 45, 52
See application file for complete search history.

(56) References Cited

U.S. PATENT DOCUMENTS

| | | | |
|---|---|---|---|
| 4,977,455 | A | 12/1990 | Young |
| 5,151,789 | A | 9/1992 | Young |
| 5,158,155 | A | 10/1992 | Domain et al. |
| 5,253,066 | A | 10/1993 | Vogel |
| 5,307,173 | A | 4/1994 | Yuen et al. |
| 5,335,079 | A | 8/1994 | Yuen et al. |
| 5,353,121 | A | 10/1994 | Young et al. |
| 5,382,983 | A | 1/1995 | Kwoh et al. |
| 5,442,390 | A | 8/1995 | Hooper et al. |
| 5,473,362 | A | 12/1995 | Fitzgerald et al. |

(Continued)

Primary Examiner — Mulugeta Mengesha

(57) ABSTRACT

An exemplary system includes a media content processing subsystem configured to provide a program guide graphical user interface ("GUI") to a display for presentation to a user, the program guide GUI including a portion of a program guide. The media content processing subsystem is further configured to provide at least one navigation tool to the display for presentation in the program guide GUI, the navigation tool including a plurality of selectable options for navigating the program guide. The media content processing subsystem is further configured to detect a user selection of one of the selectable options and initiate a navigation to a location in the program guide based on the selected option. In certain embodiments, the navigation tool includes at least one of a time-based navigation tool and a channel navigation tool.

21 Claims, 21 Drawing Sheets

(56) References Cited

U.S. PATENT DOCUMENTS

| | | | |
|---|---|---|---|
| 5,479,266 A | 12/1995 | Young et al. |
| 5,479,268 A | 12/1995 | Young et al. |
| 5,499,103 A | 3/1996 | Mankovitz |
| 5,510,811 A | 4/1996 | Tobey et al. |
| 5,512,963 A | 4/1996 | Mankovitz |
| 5,515,173 A | 5/1996 | Mankovitz et al. |
| 5,517,257 A | 5/1996 | Dunn et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,585,838 A | 12/1996 | Lawler et al. |
| 5,600,368 A | 2/1997 | Matthews |
| 5,600,711 A | 2/1997 | Yuen |
| 5,616,876 A | 4/1997 | Cluts |
| 5,619,274 A | 4/1997 | Roop et al. |
| 5,623,613 A | 4/1997 | Rowe et al. |
| 5,630,119 A | 5/1997 | Aristides et al. |
| 5,640,484 A | 6/1997 | Mankovitz |
| 5,648,824 A | 7/1997 | Dunn et al. |
| 5,654,748 A | 8/1997 | Matthews |
| 5,657,072 A | 8/1997 | Aristides et al. |
| 5,673,401 A | 9/1997 | Volk et al. |
| 5,677,708 A | 10/1997 | Matthews et al. |
| 5,678,012 A | 10/1997 | Kimmich et al. |
| 5,682,511 A | 10/1997 | Sposato et al. |
| 5,684,525 A | 11/1997 | Klosterman |
| 5,687,331 A | 11/1997 | Volk et al. |
| 5,689,663 A | 11/1997 | Williams |
| 5,694,176 A * | 12/1997 | Bruette et al. ............ 725/43 |
| 5,699,107 A | 12/1997 | Lawler et al. |
| 5,701,383 A | 12/1997 | Russo et al. |
| 5,706,145 A | 1/1998 | Hindman et al. |
| 5,721,829 A | 2/1998 | Dunn et al. |
| 5,724,492 A | 3/1998 | Matthews et al. |
| 5,727,060 A | 3/1998 | Young |
| 5,731,844 A | 3/1998 | Rauch et al. |
| 5,734,786 A | 3/1998 | Mankovitz |
| 5,734,823 A | 3/1998 | Saigh et al. |
| 5,734,891 A | 3/1998 | Saigh |
| 5,745,095 A | 4/1998 | Parchem et al. |
| 5,745,713 A | 4/1998 | Ferguson et al. |
| 5,751,282 A | 5/1998 | Girard et al. |
| 5,752,160 A | 5/1998 | Dunn |
| 5,757,417 A | 5/1998 | Aras et al. |
| 5,758,258 A | 5/1998 | Shoff et al. |
| 5,758,259 A | 5/1998 | Lawler |
| 5,774,172 A | 6/1998 | Kapell et al. |
| 5,781,228 A | 7/1998 | Sposato |
| 5,790,115 A | 8/1998 | Pleyer et al. |
| 5,790,198 A | 8/1998 | Roop et al. |
| 5,793,973 A | 8/1998 | Birdwell et al. |
| 5,801,787 A | 9/1998 | Schein et al. |
| 5,805,165 A | 9/1998 | Thorne et al. |
| 5,805,763 A | 9/1998 | Lawler et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,815,145 A | 9/1998 | Matthews |
| 5,815,195 A | 9/1998 | Tam |
| 5,828,945 A | 10/1998 | Klosterman |
| 5,857,190 A | 1/1999 | Brown |
| 5,861,906 A | 1/1999 | Dunn et al. |
| 5,870,150 A | 2/1999 | Yuen |
| 5,872,588 A | 2/1999 | Aras et al. |
| 5,874,985 A | 2/1999 | Matthews |
| 5,878,141 A | 3/1999 | Daly et al. |
| 5,883,627 A | 3/1999 | Pleyer |
| 5,886,746 A | 3/1999 | Yuen et al. |
| 5,900,905 A | 5/1999 | Shoff et al. |
| 5,905,522 A | 5/1999 | Lawler |
| 5,907,323 A | 5/1999 | Lawler et al. |
| 5,914,746 A | 6/1999 | Matthews et al. |
| 5,915,026 A | 6/1999 | Mankovitz |
| 5,923,362 A | 7/1999 | Klosterman |
| 5,940,073 A | 8/1999 | Klosterman et al. |
| 5,940,074 A | 8/1999 | Britt et al. |
| 5,945,987 A | 8/1999 | Dunn |
| 5,945,991 A | 8/1999 | Britt et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,987,509 A | 11/1999 | Portuesi |
| 5,988,078 A | 11/1999 | Levine |
| 5,990,883 A | 11/1999 | Byrne et al. |
| 5,991,498 A | 11/1999 | Young |
| 6,002,394 A | 12/1999 | Schein et al. |
| 6,002,852 A | 12/1999 | Birdwell et al. |
| 6,005,563 A | 12/1999 | White et al. |
| 6,008,803 A | 12/1999 | Rowe et al. |
| 6,008,836 A | 12/1999 | Bruck et al. |
| 6,014,706 A | 1/2000 | Cannon et al. |
| 6,016,141 A | 1/2000 | Knudson et al. |
| 6,025,837 A | 2/2000 | Matthews et al. |
| 6,028,599 A | 2/2000 | Yuen et al. |
| 6,028,604 A | 2/2000 | Matthews et al. |
| 6,034,689 A | 3/2000 | White et al. |
| 6,049,652 A | 4/2000 | Yuen et al. |
| 6,052,145 A | 4/2000 | Macrae et al. |
| 6,055,314 A | 4/2000 | Spies et al. |
| D424,061 S | 5/2000 | Backs et al. |
| D424,577 S | 5/2000 | Backs et al. |
| 6,072,485 A | 6/2000 | Barnes et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,098,086 A | 8/2000 | Krueger et al. |
| 6,118,492 A | 9/2000 | Milnes et al. |
| D431,552 S | 10/2000 | Backs et al. |
| 6,133,909 A | 10/2000 | Schein et al. |
| 6,133,913 A | 10/2000 | White et al. |
| 6,137,950 A | 10/2000 | Yuen |
| 6,141,003 A | 10/2000 | Chor et al. |
| 6,141,678 A | 10/2000 | Britt |
| D433,403 S | 11/2000 | Backs et al. |
| D434,043 S | 11/2000 | Holland et al. |
| 6,144,378 A | 11/2000 | Lee |
| 6,144,401 A | 11/2000 | Casement et al. |
| 6,144,964 A | 11/2000 | Breese et al. |
| 6,151,059 A | 11/2000 | Schein et al. |
| 6,154,205 A | 11/2000 | Carroll et al. |
| D435,561 S | 12/2000 | Pettigrew et al. |
| 6,167,188 A | 12/2000 | Young et al. |
| 6,169,541 B1 | 1/2001 | Smith |
| 6,173,317 B1 | 1/2001 | Chaddha et al. |
| 6,177,931 B1 | 1/2001 | Alexander et al. |
| 6,177,945 B1 | 1/2001 | Pleyer |
| 6,182,072 B1 | 1/2001 | Leak et al. |
| 6,184,877 B1 | 2/2001 | Dodson et al. |
| 6,188,401 B1 | 2/2001 | Peyer |
| 6,215,483 B1 | 4/2001 | Zigmond |
| 6,215,526 B1 | 4/2001 | Barton et al. |
| 6,216,265 B1 | 4/2001 | Roop et al. |
| 6,230,319 B1 | 5/2001 | Britt et al. |
| 6,233,389 B1 | 5/2001 | Barton et al. |
| 6,237,022 B1 | 5/2001 | Bruck et al. |
| 6,239,794 B1 | 5/2001 | Yuen et al. |
| 6,240,555 B1 | 5/2001 | Shoff et al. |
| 6,247,176 B1 | 6/2001 | Schein et al. |
| D445,801 S | 7/2001 | Ma |
| 6,259,442 B1 | 7/2001 | Britt et al. |
| 6,262,722 B1 | 7/2001 | Allison et al. |
| 6,263,501 B1 | 7/2001 | Schein et al. |
| 6,266,059 B1 | 7/2001 | Matthews et al. |
| 6,268,856 B1 | 7/2001 | Bruck et al. |
| 6,292,834 B1 | 9/2001 | Ravi et al. |

(56) References Cited

U.S. PATENT DOCUMENTS

| | | |
|---|---|---|
| 6,304,969 B1 | 10/2001 | Wasserman et al. |
| 6,308,202 B1 | 10/2001 | Cohn et al. |
| 6,310,886 B1 | 10/2001 | Barton |
| 6,311,197 B2 | 10/2001 | Mighdoll et al. |
| D450,058 S | 11/2001 | Istvan et al. |
| D450,324 S | 11/2001 | Istvan et al. |
| D450,711 S | 11/2001 | Istvan et al. |
| 6,313,851 B1 | 11/2001 | Matthews et al. |
| 6,317,780 B1 | 11/2001 | Cohn et al. |
| 6,317,791 B1 | 11/2001 | Cohn et al. |
| 6,317,885 B1 | 11/2001 | Fries |
| 6,323,911 B1 | 11/2001 | Schein et al. |
| 6,327,418 B1 | 12/2001 | Barton |
| 6,330,719 B1 | 12/2001 | Zigmond et al. |
| 6,340,997 B1 | 1/2002 | Borseth |
| 6,341,195 B1 | 1/2002 | Mankovitz et al. |
| 6,341,374 B2 | 1/2002 | Schein et al. |
| D453,767 S | 2/2002 | Istvan et al. |
| D453,768 S | 2/2002 | Wilkins |
| D453,936 S | 2/2002 | Istvan et al. |
| 6,344,865 B1 | 2/2002 | Matthews et al. |
| 6,345,264 B1 | 2/2002 | Breese et al. |
| 6,347,398 B1 | 2/2002 | Parthasarathy et al. |
| 6,353,813 B1 | 3/2002 | Breese et al. |
| 6,378,035 B1 | 4/2002 | Parry et al. |
| 6,385,739 B1 | 5/2002 | Barton et al. |
| 6,388,714 B1 | 5/2002 | Schein et al. |
| 6,392,664 B1 | 5/2002 | White et al. |
| 6,396,473 B1 | 5/2002 | Callahan et al. |
| 6,396,546 B1 | 5/2002 | Alten et al. |
| 6,397,388 B1 | 5/2002 | Allen |
| 6,400,407 B1 | 6/2002 | Zigmond et al. |
| 6,412,110 B1 | 6/2002 | Schein et al. |
| 6,412,112 B1 | 6/2002 | Barrett et al. |
| 6,424,342 B1 | 7/2002 | Perlman et al. |
| 6,425,125 B1 | 7/2002 | Fries et al. |
| 6,430,358 B1 | 8/2002 | Yuen et al. |
| 6,430,359 B1 | 8/2002 | Yuen et al. |
| D462,333 S | 9/2002 | Novak |
| D462,339 S | 9/2002 | Allen et al. |
| D463,444 S | 9/2002 | Istvan et al. |
| 6,449,766 B1 | 9/2002 | Fleming |
| 6,453,471 B1 | 9/2002 | Klosterman |
| D463,788 S | 10/2002 | Smith et al. |
| 6,460,180 B1 | 10/2002 | Park et al. |
| 6,460,181 B1 | 10/2002 | Donnelly |
| 6,463,486 B1 | 10/2002 | Parry et al. |
| 6,466,734 B2 | 10/2002 | Yuen et al. |
| 6,469,721 B2 | 10/2002 | Matthews et al. |
| 6,469,753 B1 | 10/2002 | Klosterman et al. |
| 6,473,858 B1 | 10/2002 | Shimomura et al. |
| D465,227 S | 11/2002 | Ro et al. |
| 6,477,705 B1 | 11/2002 | Yuen et al. |
| 6,487,646 B1 | 11/2002 | Adams et al. |
| 6,489,986 B1 | 12/2002 | Allen |
| 6,490,722 B1 | 12/2002 | Barton et al. |
| 6,496,205 B1 | 12/2002 | White et al. |
| 6,498,754 B2 | 12/2002 | Peting et al. |
| 6,498,895 B2 | 12/2002 | Young et al. |
| 6,499,057 B1 | 12/2002 | Portuesi |
| D468,274 S | 1/2003 | Novak |
| D469,104 S | 1/2003 | Istvan et al. |
| D469,443 S | 1/2003 | Wilkins et al. |
| 6,505,232 B1 | 1/2003 | Mighdoll et al. |
| 6,505,348 B1 | 1/2003 | Knowles et al. |
| D470,152 S | 2/2003 | Witus |
| D470,153 S | 2/2003 | Billmaier et al. |
| 6,519,771 B1 | 2/2003 | Zenith |
| 6,526,471 B1 | 2/2003 | Shimomura et al. |
| 6,526,580 B2 | 2/2003 | Shimomura et al. |
| 6,529,233 B1 | 3/2003 | Allen |
| 6,535,253 B2 | 3/2003 | Barton et al. |
| 6,535,920 B1 | 3/2003 | Parry et al. |
| 6,538,701 B1 | 3/2003 | Yuen |
| 6,539,375 B2 | 3/2003 | Kawasaki |
| 6,549,719 B2 | 4/2003 | Mankovitz |
| D474,197 S | 5/2003 | Nguyen |
| 6,559,866 B2 | 5/2003 | Kolde et al. |
| 6,559,894 B2 | 5/2003 | Omura et al. |
| 6,560,678 B1 | 5/2003 | Weissman et al. |
| 6,560,777 B2 | 5/2003 | Blackketter et al. |
| 6,564,379 B1 | 5/2003 | Knudson et al. |
| 6,567,606 B2 | 5/2003 | Milnes et al. |
| 6,570,581 B1 | 5/2003 | Smith |
| 6,571,390 B1 | 5/2003 | Dunn et al. |
| 6,571,392 B1 | 5/2003 | Zigmond et al. |
| D475,718 S | 6/2003 | Witus et al. |
| 6,577,346 B1 | 6/2003 | Perlman |
| D476,994 S | 7/2003 | Simmons et al. |
| 6,588,013 B1 | 7/2003 | Lumley et al. |
| D478,090 S | 8/2003 | Nguyen et al. |
| D478,595 S | 8/2003 | Istvan et al. |
| D478,912 S | 8/2003 | Johnson |
| 6,606,652 B1 | 8/2003 | Cohn et al. |
| 6,628,301 B1 | 9/2003 | Acton et al. |
| 6,628,302 B2 | 9/2003 | White et al. |
| D480,733 S | 10/2003 | Hammerquist et al. |
| 6,630,963 B1 | 10/2003 | Billmaier |
| 6,631,523 B1 | 10/2003 | Matthews et al. |
| 6,633,877 B1 | 10/2003 | Saigh et al. |
| 6,637,031 B1 | 10/2003 | Chou |
| 6,637,032 B1 | 10/2003 | Feinleib |
| 6,642,939 B1 | 11/2003 | Vallone et al. |
| 6,643,798 B2 | 11/2003 | Barton et al. |
| 6,651,251 B1 | 11/2003 | Shoff et al. |
| RE38,376 E | 12/2003 | Matthews, III |
| 6,662,218 B2 | 12/2003 | Mighdoll et al. |
| 6,668,133 B2 | 12/2003 | Yuen et al. |
| 6,668,377 B1 | 12/2003 | Dunn |
| 6,678,737 B1 | 1/2004 | Bucher |
| 6,681,396 B1 | 1/2004 | Bates et al. |
| 6,683,630 B1 | 1/2004 | Shoff et al. |
| 6,684,025 B1 | 1/2004 | Perlman |
| D486,834 S | 2/2004 | Allen et al. |
| 6,687,906 B1 | 2/2004 | Yuen et al. |
| 6,694,352 B1 | 2/2004 | Omoigui |
| 6,698,020 B1 | 2/2004 | Zigmond et al. |
| 6,704,058 B2 | 3/2004 | Ranta |
| 6,704,773 B1 | 3/2004 | Cohn et al. |
| 6,704,776 B1 | 3/2004 | Fortune |
| 6,704,813 B2 | 3/2004 | Smirnov et al. |
| 6,704,929 B1 | 3/2004 | Ozer et al. |
| 6,708,335 B1 | 3/2004 | Ozer et al. |
| 6,710,815 B1 | 3/2004 | Billmaier et al. |
| 6,721,953 B1 | 4/2004 | Bates et al. |
| 6,724,405 B2 | 4/2004 | Matthews et al. |
| 6,727,935 B1 | 4/2004 | Allen et al. |
| 6,728,713 B1 | 4/2004 | Beach et al. |
| D490,086 S | 5/2004 | Wilkins et al. |
| 6,732,325 B1 | 5/2004 | Tash et al. |
| 6,732,369 B1 | 5/2004 | Schein et al. |
| 6,742,043 B1 | 5/2004 | Moussa et al. |
| 6,742,183 B1 | 5/2004 | Reynolds et al. |
| 6,745,391 B1 * | 6/2004 | Macrae et al. .................. 725/42 |
| 6,748,375 B1 | 6/2004 | Wong et al. |
| 6,748,481 B1 | 6/2004 | Parry et al. |
| 6,754,715 B1 | 6/2004 | Cannon et al. |
| 6,756,997 B1 | 6/2004 | Ward et al. |
| 6,757,837 B1 | 6/2004 | Platt et al. |
| 6,757,906 B1 | 6/2004 | Look et al. |
| 6,760,537 B2 | 7/2004 | Mankovitz |
| 6,762,773 B2 | 7/2004 | Kolde et al. |
| 6,766,523 B2 | 7/2004 | Herley |
| 6,766,524 B1 | 7/2004 | Matheny et al. |
| D494,186 S | 8/2004 | Johnson |
| 6,772,438 B1 | 8/2004 | Blackketter et al. |
| 6,785,901 B1 | 8/2004 | Horiwitz et al. |
| 6,785,902 B1 | 8/2004 | Zigmond et al. |
| D496,665 S | 9/2004 | Billmaier et al. |
| 6,792,195 B2 | 9/2004 | Barton |
| 6,798,457 B2 | 9/2004 | Boyden et al. |
| 6,798,971 B2 | 9/2004 | Potrebic |
| 6,799,326 B2 | 9/2004 | Boylan et al. |
| 6,799,327 B1 | 9/2004 | Reynolds et al. |

(56) References Cited

U.S. PATENT DOCUMENTS

| | | |
|---|---|---|
| 6,804,824 B1 | 10/2004 | Potrebic et al. |
| 6,804,825 B1 | 10/2004 | White et al. |
| 6,813,643 B2 | 11/2004 | Perlman |
| 6,819,344 B2 | 11/2004 | Robbins |
| 6,820,144 B2 | 11/2004 | Smirnov et al. |
| 6,829,779 B1 | 12/2004 | Perlman |
| 6,842,837 B1 | 1/2005 | Peting et al. |
| 6,847,778 B1 | 1/2005 | Vallone et al. |
| 6,847,779 B2 | 1/2005 | Pietraszak |
| 6,850,691 B1 | 2/2005 | Stam et al. |
| 6,850,693 B2 | 2/2005 | Young et al. |
| 6,859,799 B1 | 2/2005 | Yuen |
| 6,859,937 B1 | 2/2005 | Narayan et al. |
| 6,861,952 B1 | 3/2005 | Billmaier |
| 6,865,555 B2 | 3/2005 | Novak |
| 6,868,225 B1 | 3/2005 | Brown et al. |
| 6,868,551 B1 | 3/2005 | Lawler et al. |
| 6,886,179 B1 | 4/2005 | Perlman |
| 6,891,553 B2 | 5/2005 | White et al. |
| 6,892,390 B1 | 5/2005 | Lieberman et al. |
| 6,897,904 B2 | 5/2005 | Potrebic et al. |
| 6,898,765 B2 | 5/2005 | Matthews et al. |
| 6,901,453 B1 | 5/2005 | Pritchett et al. |
| 6,903,753 B1 | 6/2005 | Gray et al. |
| 6,904,609 B1 | 6/2005 | Pietraszak et al. |
| 6,906,755 B2 | 6/2005 | Lundblad et al. |
| 6,907,576 B2 | 6/2005 | Barbanson et al. |
| 6,915,528 B1 | 7/2005 | McKenna |
| 6,928,652 B1 | 8/2005 | Goldman |
| 6,928,655 B1 | 8/2005 | Omoigui |
| 6,931,657 B1 | 8/2005 | Marsh |
| 6,938,077 B2 | 8/2005 | Sanders |
| 6,938,270 B2 | 8/2005 | Blackketter et al. |
| 6,941,575 B2 | 9/2005 | Allen |
| 6,943,843 B2 | 9/2005 | Boyden et al. |
| 6,944,880 B1 | 9/2005 | Allen |
| 6,947,935 B1 | 9/2005 | Horvitz et al. |
| 6,957,260 B1 | 10/2005 | Mighdoll et al. |
| 6,963,903 B2 | 11/2005 | Krueger et al. |
| 6,963,906 B2 | 11/2005 | Portuesi |
| 6,965,415 B2 | 11/2005 | Lundblad et al. |
| 6,965,730 B2 | 11/2005 | Chamberlin et al. |
| 6,966,066 B1 | 11/2005 | Zigmond et al. |
| 6,968,364 B1 | 11/2005 | Wong et al. |
| 6,970,640 B2 | 11/2005 | Green et al. |
| 6,972,787 B1 | 12/2005 | Allen et al. |
| 6,973,050 B2 | 12/2005 | Birdwell et al. |
| 6,973,664 B2 | 12/2005 | Fries |
| 6,973,669 B2 | 12/2005 | Daniels |
| 6,975,713 B1 | 12/2005 | Smith et al. |
| 6,975,717 B1 | 12/2005 | Smith et al. |
| 6,978,473 B1 * | 12/2005 | Nsonwu et al. ............ 725/52 |
| 6,980,638 B1 | 12/2005 | Smith |
| 6,980,993 B2 | 12/2005 | Horvitz et al. |
| 6,981,227 B1 | 12/2005 | Taylor |
| 6,986,062 B2 | 1/2006 | Carpenter |
| 6,990,462 B1 | 1/2006 | Wilcox et al. |
| 6,990,497 B2 | 1/2006 | O'Rourke et al. |
| 6,990,671 B1 | 1/2006 | Evans et al. |
| 6,990,677 B1 | 1/2006 | Pietraszak et al. |
| 6,990,678 B2 | 1/2006 | Zigmond |
| 6,993,532 B1 | 1/2006 | Platt et al. |
| 6,996,390 B2 | 2/2006 | Herley et al. |
| 7,003,795 B2 | 2/2006 | Allen |
| 7,006,613 B2 | 2/2006 | Novak et al. |
| 7,007,244 B2 | 2/2006 | Pankovcin |
| D516,573 S | 3/2006 | Gibson |
| D517,059 S | 3/2006 | Newby et al. |
| D517,087 S | 3/2006 | Sands |
| 7,010,265 B2 | 3/2006 | Coffin |
| 7,013,238 B1 | 3/2006 | Weare |
| 7,015,925 B2 | 3/2006 | Ford et al. |
| 7,017,174 B1 | 3/2006 | Sheedy |
| D518,487 S | 4/2006 | MacKenzie et al. |
| D519,122 S | 4/2006 | MacKenzie et al. |
| D519,519 S | 4/2006 | Vong |
| D519,521 S | 4/2006 | Fong |
| 7,023,492 B2 | 4/2006 | Sullivan |
| 7,024,424 B1 | 4/2006 | Platt et al. |
| 7,026,964 B2 | 4/2006 | Baldwin et al. |
| 7,027,101 B1 | 4/2006 | Sloo et al. |
| 7,028,325 B1 | 4/2006 | Rui et al. |
| 7,030,886 B2 | 4/2006 | Ford et al. |
| 7,032,177 B2 | 4/2006 | Novak et al. |
| 7,034,776 B1 | 4/2006 | Love |
| 7,034,927 B1 | 4/2006 | Allen et al. |
| 7,035,355 B2 | 4/2006 | Lais et al. |
| 7,035,526 B2 | 4/2006 | Green |
| 7,036,083 B1 | 4/2006 | Zenith |
| 7,036,090 B1 | 4/2006 | Nguyen |
| 7,036,091 B1 | 4/2006 | Nguyen |
| 7,036,092 B2 | 4/2006 | Sloo et al. |
| 7,036,138 B1 | 4/2006 | Tash |
| 7,038,690 B2 | 5/2006 | Wilt et al. |
| 7,039,935 B2 | 5/2006 | Knudson et al. |
| 7,042,526 B1 | 5/2006 | Borseth |
| 7,043,477 B2 | 5/2006 | Mercer et al. |
| 7,046,805 B2 | 5/2006 | Fitzhardinge et al. |
| 7,050,097 B2 | 5/2006 | Schick et al. |
| 7,050,867 B2 | 5/2006 | Maymudes |
| 7,051,111 B1 | 5/2006 | Scullin |
| 7,051,282 B2 | 5/2006 | Marcjan |
| 7,051,351 B2 | 5/2006 | Goldman et al. |
| 7,055,031 B2 | 5/2006 | Platt |
| 7,055,104 B1 | 5/2006 | Billmaier et al. |
| 7,058,720 B1 | 6/2006 | Majidimehr |
| 7,058,816 B2 | 6/2006 | Valeria |
| 7,058,936 B2 | 6/2006 | Chilimbi et al. |
| 7,065,553 B1 | 6/2006 | Chesley et al. |
| 7,069,284 B2 | 6/2006 | Peting |
| 7,069,576 B1 | 6/2006 | Knudson et al. |
| 7,071,968 B2 | 7/2006 | Novak |
| 7,073,118 B2 | 7/2006 | Greenberg et al. |
| 7,073,193 B2 | 7/2006 | Marsh |
| 7,076,202 B1 | 7/2006 | Billmaier |
| 7,076,734 B2 | 7/2006 | Wolff et al. |
| 7,076,792 B2 | 7/2006 | Zigmond et al. |
| 7,076,794 B2 | 7/2006 | Lieberman et al. |
| 7,080,394 B2 | 7/2006 | Istvan et al. |
| 7,088,910 B2 | 8/2006 | Potrebic et al. |
| 7,093,273 B2 | 8/2006 | Marsh |
| 7,098,868 B2 | 8/2006 | Love et al. |
| 7,099,952 B2 | 8/2006 | Wong et al. |
| 7,103,904 B1 | 9/2006 | Blackketter et al. |
| 7,103,905 B2 | 9/2006 | Novak |
| 7,103,908 B2 | 9/2006 | Tomsen |
| 7,107,532 B1 | 9/2006 | Billmaier et al. |
| 7,107,608 B2 | 9/2006 | Wagner et al. |
| 7,111,320 B1 | 9/2006 | Novak |
| 7,116,894 B1 | 10/2006 | Chatterton |
| 7,117,439 B2 | 10/2006 | Barrett et al. |
| 7,127,127 B2 | 10/2006 | Jojic et al. |
| 7,130,846 B2 | 10/2006 | Danker et al. |
| 7,131,054 B2 | 10/2006 | Greenberg et al. |
| 7,142,230 B2 | 11/2006 | Novak et al. |
| 7,146,632 B2 | 12/2006 | Miller |
| 7,155,675 B2 | 12/2006 | Billmaier et al. |
| 7,155,734 B1 | 12/2006 | Shimomura et al. |
| 7,158,531 B2 | 1/2007 | Barton |
| 7,159,176 B2 | 1/2007 | Billmaier et al. |
| 7,159,177 B2 | 1/2007 | Billmaier et al. |
| 7,161,877 B2 | 1/2007 | Lai et al. |
| 7,161,994 B2 | 1/2007 | Shah et al. |
| 7,162,728 B1 | 1/2007 | Bahn |
| 7,165,264 B1 | 1/2007 | Westrick |
| 7,167,531 B2 | 1/2007 | Greenberg et al. |
| 7,194,511 B2 | 3/2007 | Stettner |
| 7,194,754 B2 | 3/2007 | Tomsen |
| 7,197,234 B1 | 3/2007 | Chatterton |
| 7,197,715 B1 | 3/2007 | Valeria |
| 7,200,321 B2 | 4/2007 | Otala et al. |
| 7,200,859 B1 | 4/2007 | Perlman et al. |
| 7,203,952 B2 | 4/2007 | Broadus |
| 7,216,235 B1 | 5/2007 | Platt |

(56) References Cited

U.S. PATENT DOCUMENTS

| | | |
|---|---|---|
| 7,228,556 B2 | 6/2007 | Beach et al. |
| 7,236,204 B2 | 6/2007 | Perlman |
| 7,237,252 B2 | 6/2007 | Billmaier |
| 7,243,123 B1 | 7/2007 | Allen et al. |
| 7,245,817 B1 | 7/2007 | Nichols et al. |
| 7,251,255 B1 | 7/2007 | Young |
| 7,251,294 B2 | 7/2007 | Peting |
| 7,263,362 B1 | 8/2007 | Young et al. |
| D551,668 S | 9/2007 | Newby et al. |
| 7,266,832 B2 | 9/2007 | Miller |
| 7,266,835 B2 | 9/2007 | Halbert |
| 7,272,298 B1 | 9/2007 | Lang et al. |
| 7,272,657 B2 | 9/2007 | Allen et al. |
| D552,610 S | 10/2007 | Newby et al. |
| 7,302,696 B1 | 11/2007 | Yamamoto |
| 7,310,355 B1 | 12/2007 | Krein et al. |
| 7,313,802 B1 | 12/2007 | Tomsen |
| 7,320,134 B1 | 1/2008 | Tomsen et al. |
| 7,320,137 B1 | 1/2008 | Novak et al. |
| 7,321,716 B1 | 1/2008 | Vallone et al. |
| 7,340,761 B2 | 3/2008 | Billmaier |
| 7,350,157 B1 | 3/2008 | Billmaier et al. |
| 7,360,232 B2 | 4/2008 | Mitchell |
| 7,380,260 B1 | 5/2008 | Billmaier et al. |
| 7,382,838 B2 | 6/2008 | Peting |
| 7,386,129 B2 | 6/2008 | Perlman |
| 7,391,808 B1 | 6/2008 | Farrand |
| 7,409,546 B2 | 8/2008 | Platt |
| 7,428,023 B2 | 9/2008 | Allen et al. |
| 7,434,246 B2 | 10/2008 | Florence |
| 7,440,523 B2 | 10/2008 | Lais et al. |
| 7,463,737 B2 | 12/2008 | Gillon |
| 7,466,640 B2 | 12/2008 | Snow et al. |
| 7,484,234 B1 | 1/2009 | Heaton |
| 7,487,459 B2 | 2/2009 | Billmaier et al. |
| 7,487,529 B2 | 2/2009 | Orlick |
| 7,493,015 B1 | 2/2009 | Van Stam et al. |
| 7,518,629 B2 | 4/2009 | Novak et al. |
| 7,529,465 B2 | 5/2009 | Barton et al. |
| 7,533,403 B1 | 5/2009 | Krein et al. |
| 7,543,325 B2 | 6/2009 | Westbrook et al. |
| 7,546,622 B2 | 6/2009 | Tash |
| 7,558,472 B2 | 7/2009 | Locket et al. |
| 7,573,529 B1 | 8/2009 | Perlman |
| 7,574,656 B2 | 8/2009 | Billmaier et al. |
| 7,590,240 B2 | 9/2009 | Platt et al. |
| 7,594,246 B1 | 9/2009 | Billmaier et al. |
| 7,650,569 B1 | 1/2010 | Allen et al. |
| 7,661,121 B2 | 2/2010 | Smith et al. |
| 7,665,111 B1 | 2/2010 | Barton |
| 7,668,435 B2 | 2/2010 | Lockett et al. |
| 7,671,758 B1 | 3/2010 | Seidel et al. |
| 2001/0029610 A1 | 10/2001 | Corvin et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0069415 A1* | 6/2002 | Humbard et al. ............ 725/52 |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0110495 A1 | 6/2003 | Bennington et al. |
| 2003/0110499 A1 | 6/2003 | Knudson et al. |
| 2003/0110500 A1* | 6/2003 | Rodriguez ............ 725/46 |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2003/0221192 A1 | 11/2003 | Rappaport et al. |
| 2004/0010806 A1 | 1/2004 | Yuen et al. |
| 2004/0045025 A1 | 3/2004 | Ward et al. |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0239809 A1* | 12/2004 | Kim et al. ............ 348/563 |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0160456 A1* | 7/2005 | Moskowitz ............ 725/45 |
| 2005/0216936 A1 | 9/2005 | Knudson et al. |
| 2005/0251824 A1 | 11/2005 | Thomas et al. |
| 2005/0278768 A1* | 12/2005 | Boyer et al. ............ 725/113 |
| 2006/0095937 A1 | 5/2006 | Knudson et al. |
| 2006/0156336 A1 | 7/2006 | Knudson et al. |
| 2006/0212894 A1 | 9/2006 | Knudson et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2009/0125843 A1 | 5/2009 | Billmaier et al. |

* cited by examiner

| | Live F... | Situation | | Truck Universe | Li... |
|---|---|---|---|---|---|
| 10 CNN | | | | | |
| 57 ESPN2 | Nascar | | | | |
| | 3:00 PM – Fri, Nov. 3 | 3:30 PM | 4:00 PM | | |
| 3:23 PM | ◀ Most Extre... | K-9 Canine | Jaws II | | |
| 86 Animal Planet | Most Extreme: Deadly Snakes<br>Snakes are natural born predators. Filmed in the Australian Outback, you won't believe the incredible rare footage captured by Corwin and team. | | | | |
| 60 MILT | Wings over Viet... | Wings over Iraq | Off to War | | |
| 68 SOAP Net | Dallas | | | | |
| 74 VH-1 | Where Are They Now? | | Guiding Light | | |
| 73 Comedy | 10 | Pee-Wee Herman | The 80's | | |

GUIDE: OPTIONS

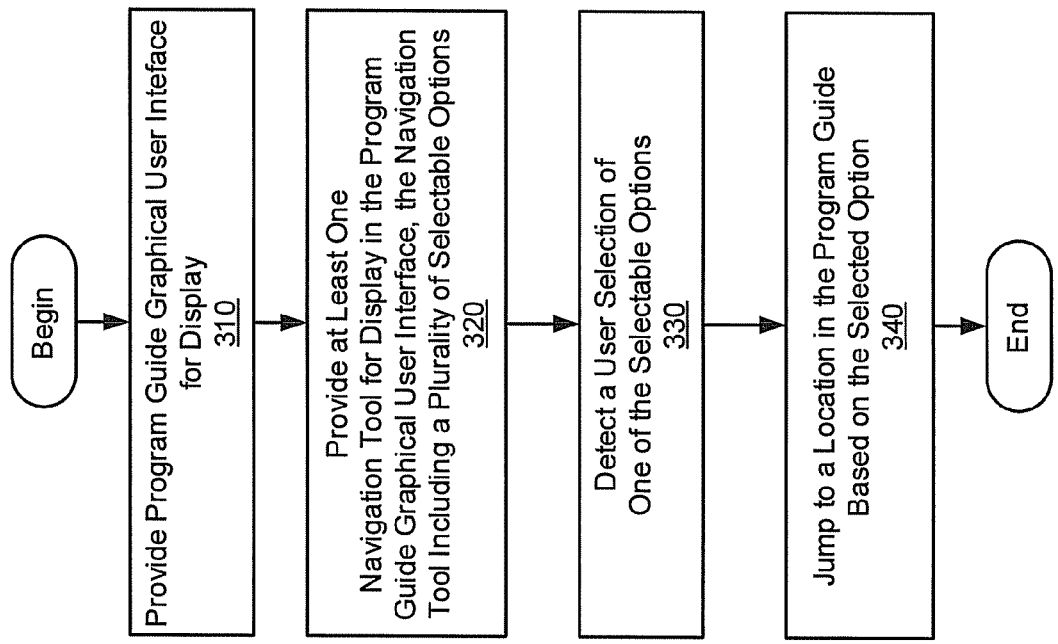

_US 8,935,728 B2_

PROGRAM GUIDE NAVIGATION TOOLS FOR MEDIA CONTENT ACCESS SYSTEMS AND METHODS

CROSS REFERENCE TO RELATED APPLICATIONS

This application is a continuation of U.S. patent application Ser. No. 11/614,644, filed on Dec. 21, 2006, which is hereby incorporated by reference in its entirety.

BACKGROUND INFORMATION

The set-top box ("STB") has become an important computing device for accessing media content services and the media content within those services. An STB is usually configured to provide users with access to a large number and variety of media content choices offered by a provider. For example, a user may choose to experience a variety of broadcast television programs, pay-per-view services, video-on-demand programming, Internet services, and audio programming via an STB.

The large number of media content choices offered by providers can make it difficult for a user of an STB to find and select desired media content. On-screen program guides have alleviated this problem to some degree. A user of an STB is able to scroll through a conventional program guide to search for a desired media channel or program.

As television service providers have expanded and continue to expand the services available to users (e.g., more channels), however, conventional tools for navigating through program guides have become inefficient and less effective. For example, it is a time-consuming task to scroll through a conventional program guide having hundreds of channels in search of a particular media channel or program.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 15 illustrates the program guide graphical user interface of FIG. 6, with another portion of a program guide displayed in response to the selection shown in FIG. 14.

FIG. 21 is a flowchart illustrating an exemplary method of navigating a program guide.

DETAILED DESCRIPTION OF EXEMPLARY EMBODIMENTS

I. Introduction

Figure 1:
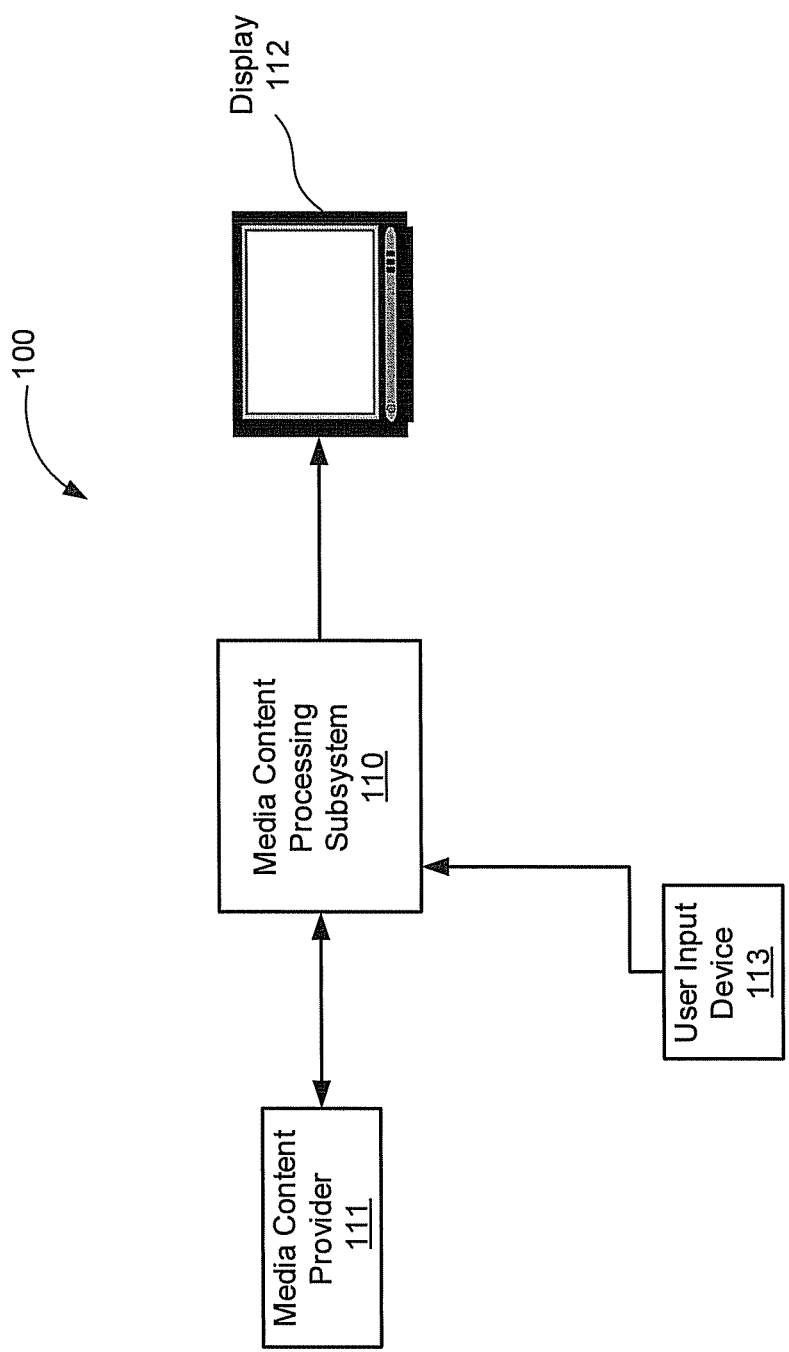
FIG. 1 illustrates an example of a media content access system.

Exemplary systems and methods for navigating a program guide are disclosed herein. In certain embodiments, a media content processing subsystem (e.g., a set-top box) may be configured to provide a program guide graphical user interface to a display (e.g., a television) for presentation to a user. The program guide graphical user interface may include a program guide, or a portion of a program guide to be presented to the user. The user may utilize the program guide to search for, identify, and select available media content that the user wishes to consider and/or experience. In particular, the program guide may provide information related to media content, including content channels and time slots associated with the media content.

The media content processing subsystem may be further configured to provide to the display for presentation in the program guide graphical user interface at least one navigation tool enabling the user to intuitively, efficiently, and selectively navigate to different locations within the program guide. In certain examples, the navigation tool includes a plurality of selectable options for navigating the program guide displayed in the program guide graphical user interface. The media content processing subsystem may detect a user selection of one of the selectable options and initiate a navigation to a location in the program guide based on the selected option. The navigation may include a direct jump to the location, the jump being made from another location in the program guide. The program guide graphical user interface may be updated to include another portion of the program guide, the other portion including the destination location.

In certain examples, the at least one navigation tool includes a time-based navigation tool enabling the user to navigate to different time slots within the program guide. The time-based navigation tool may include one or more selectable options associated with corresponding time slots within the program guide. The user may browse and select from the selectable options, and when the user selects one of the selectable options, a selector for navigation the program guide may be move to a time slot in the program guide that is associate with the selected option. The time-based navigation tool may include a calendar navigation tool having calendar days as options that can be browsed and selected by the user.

In certain examples, the at least one navigation tool may include at least one channel navigation tool enabling the user to navigate to different content channels within the program guide. A channel navigation tool may include one or more selectable options associated with corresponding content channels within the program guide. The user may browse and select from the selectable options, and when the user selects one of the options, a selector for navigating the program guide may be moved to a channel in the program guide that is associated with the selected option.

The exemplary navigation tools described herein enable a user of the media content processing subsystem to conveniently, efficiently, and intuitively navigate to different locations within a program guide. The navigation tools may include displayed selectable options (e.g., one or more menus of selectable options) that can be browsed and selected by the user in a manner that allows the user to utilize a simple input mechanism such as arrow buttons on a remote control input device to navigate and select from the options.

The program guide graphical user interface and navigation tools of the present systems and methods provide improved navigation capabilities and conveniences as compared to conventional program guides. For example, a user of an exemplary media content processing subsystem can jump to any location within the program guide that has been associated with a selectable option included in a navigation tool. This enables the user to navigate the program guide in a more convenient, efficient, and intuitive manner as compared to conventional program guides.

Components and functions of exemplary embodiments of program guide navigation tools for media content access systems and methods will now be described in more detail.

II. Exemplary System View

FIG. 1 illustrates an example of a media content access system 100 (or simply the "system 100"). As shown in FIG. 1, the system 100 may include a media content processing subsystem 110 configured to communicate with and receive a signal or data stream containing data representative of media content and/or program guide data from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, and other suitable communications networks and technologies.

The media content processing subsystem 110 may be configured to process a media content stream provided by the media content provider 111, including causing a media content instance, or one or more components (e.g., video and/or audio components) of a media content instance, to be presented for experiencing (e.g., viewing) by a user. The presentation of the media content instance may include, but is not limited to, displaying, playing back, or otherwise processing the media content instance, or one or more components of the media content instance, such that it may be experienced by the user. For example, the media content processing subsystem 110 may provide a signal to a display 112 (e.g., a television, computer monitor, etc.) so that the display 112 may present (e.g., display) media content for experiencing by the user.

The media content processing subsystem 110 may also be configured to process program guide data provided by the media content provider 111, including generating and providing a program guide graphical user interface ("GUI") for presentation to the user. The program guide GUI may include a view of the program guide, or a portion of the program guide, to be presented for viewing by a user. For example, the media content processing subsystem 110 may provide a signal to the display 112 so that the display 112 may present the program guide GUI to the user.

As shown in FIG. 1, and as will be described in more detail below, the media content processing subsystem 110 may be controlled by a user input device 113 (e.g., a remote control device). In certain examples, the user input device 113 may include simple input mechanisms by which a user can utilize any of the exemplary navigation tools described herein.

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider

Media content provider 111 may be configured to provide various types of media content and/or program guide data to the media content processing subsystem 110 using any suitable communication technologies, including any of those described herein. The media content may include one or more media content instances, or one or more segments of the media content instance(s). The term "media content instance" will be used herein to refer generally to any television program, on demand program, pay-per-view program, broadcast media program, IPTV content, commercial, advertisement, video, movie, song, video game, image, photograph, sound, or any segment, component, or combination of these or other forms of media content that may be viewed or otherwise experienced by a user.

The program guide data may include any information descriptive of content channels, programming time slots, media content instances, and relationships between the content channels, time slots, and media content instances. The term "content channel" will be used herein to refer generally to any carrier of media content, including, but not limited to, media (e.g., television) channels, streams, addresses, frequencies or other carriers of media content. The term "programming time slot" will be used herein to refer generally to any period of time associated with a scheduled broadcast of media content. Typically, the program guide data is descriptive of a programming schedule, including media content instances and the time slots and content channels associated with scheduled broadcasts of the media content instances. An example of a program guide GUI presenting program guide data will be described below.

Figure 2:
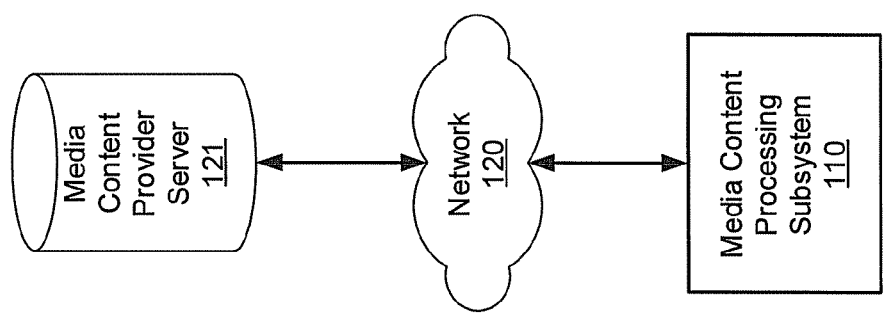
FIG. 2 is an illustration of an exemplary media content provider network.

An exemplary media content provider 111 may include a media content provider server 121, as shown in FIG. 2. The media content provider server 121 may be configured to communicate with the media content processing subsystem 110 via one or more types of networks 120 (and communications links thereto). The network 120 shown in FIG. 2 may include, but is not limited to, the Internet, an intranet or other private packet-switched network, a wireless network (e.g., a wireless phone network or a Wi-Fi network), a cable television network (e.g., a hybrid fiber-coax network), a wireless broadcast network (e.g., a satellite media broadcasting network or terrestrial broadcasting network), a subscriber television network, a telephone network, a provider-specific network (e.g., a Verizon® FIOS® network and/or a TiVo® network), an optical fiber network, any other suitable network, and any combination of these networks. In some alternative examples, the media content processing subsystem 110 may be connected directly to the media content provider server 121.

B. Display

As mentioned, the processing subsystem 110 may be coupled to a display 112 configured to present content and/or data, including media content and/or program guide data, to a user. The display 112 may display, play, or otherwise present the content and/or data for experiencing by the user. The display 112 may include, but is not limited to, a television, computer monitor, mobile phone, handheld device, display screen, or any other device configured to present content and/or data to a user.

C. Media Content Processing Subsystem

Figure 3:
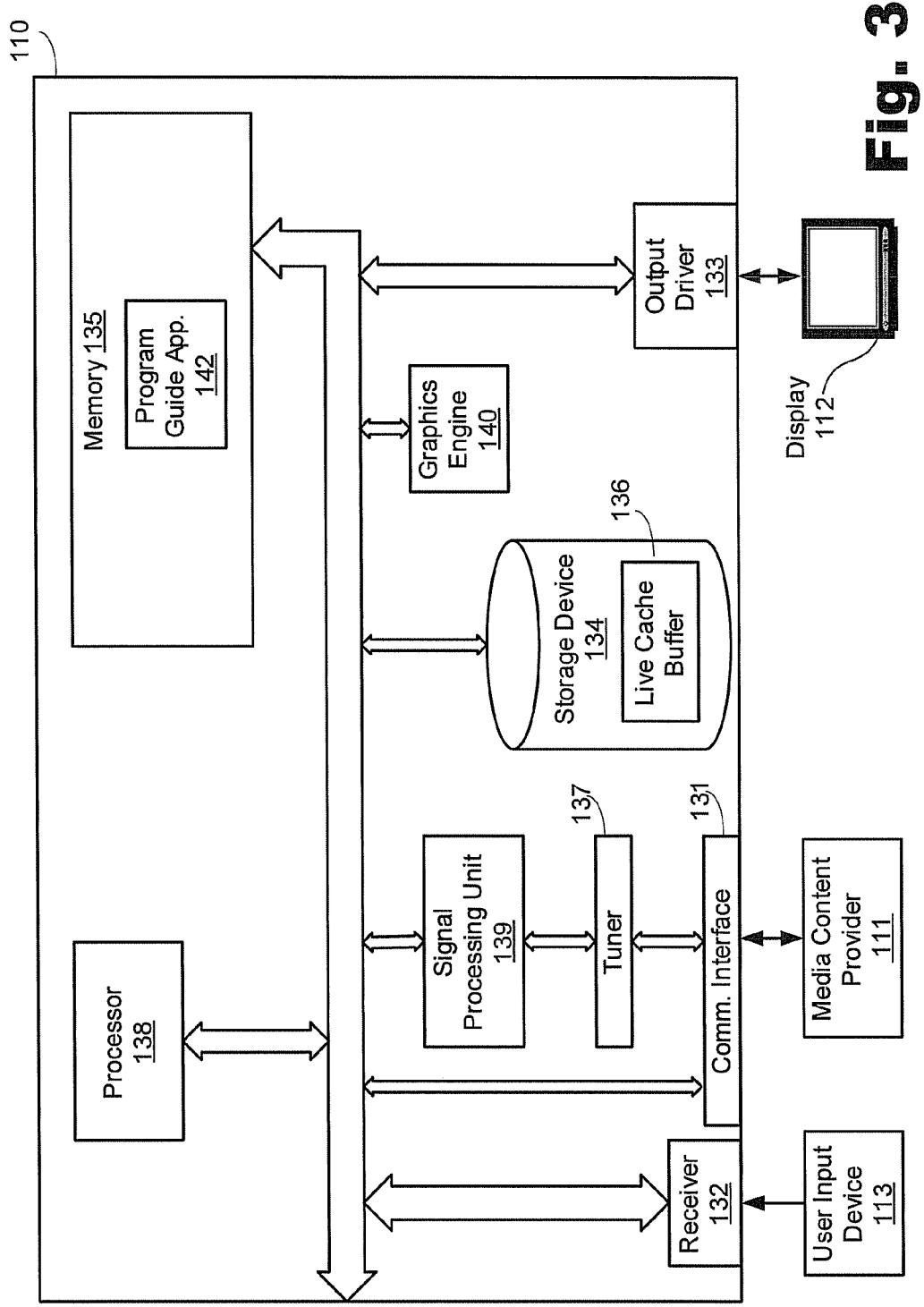
FIG. 3 is a block diagram of an exemplary media content processing subsystem.

FIG. 3 is a block diagram of an exemplary media content processing subsystem 110 (or simply "processing subsystem 110"). The processing subsystem 110 may include any combination of hardware, software, and firmware configured to process media content and/or program guide data for presentation to a user. The media content and/or program guide data may be received from the media content provider 111 and provided to the display 112 for presentation to the user. As used herein and in the appended claims, unless otherwise specifically denoted, the terms "media content processing subsystem" and "processing subsystem" will be used to refer expansively to all possible receivers that receive and process digital and/or analog media content, as well as program guide data. An exemplary processing subsystem 110 may include, but is not limited to, a set-top box ("STB"), home communication terminal ("HCT"), digital home communication terminal ("DHCT"), stand-alone personal video recorder ("PVR"), DVD player, handheld entertainment device, video-enabled phone (e.g., a mobile phone), and personal computer.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface 131 configured to receive content (e.g., media content) and/or data (e.g., program guide data) in any acceptable format from the media content provider 111 or from any other suitable media content source. The communication interface 131 may include any device, logic, and/or other technologies suitable for receiving signals and/or data representative of media content and/or other types of content or data. The communication interface 131 may be configured to interface with any suitable communication media, protocols, and formats, including any of those mentioned above.

In certain embodiments, the communication interface 131 may include a single port configured to receive media content and/or program guide data from the media content provider 111 and/or from any other source. For example, the communication interface 131 may include or be connected to a broadband connection, which can enable the processing subsystem 110 to receive media content from one or more sources on a single port. In other embodiments, multiple ports may be used.

The processing subsystem 110 may also include a receiver 132 configured to receive user input signals (e.g., program guide navigation commands) from a user input device 113. The user input device 113 may include, for example, a remote control device or any other suitable input device and may be configured to communicate with the receiver 132 via a wireless link, electrical connection, or any other suitable communication link.

Figure 4:
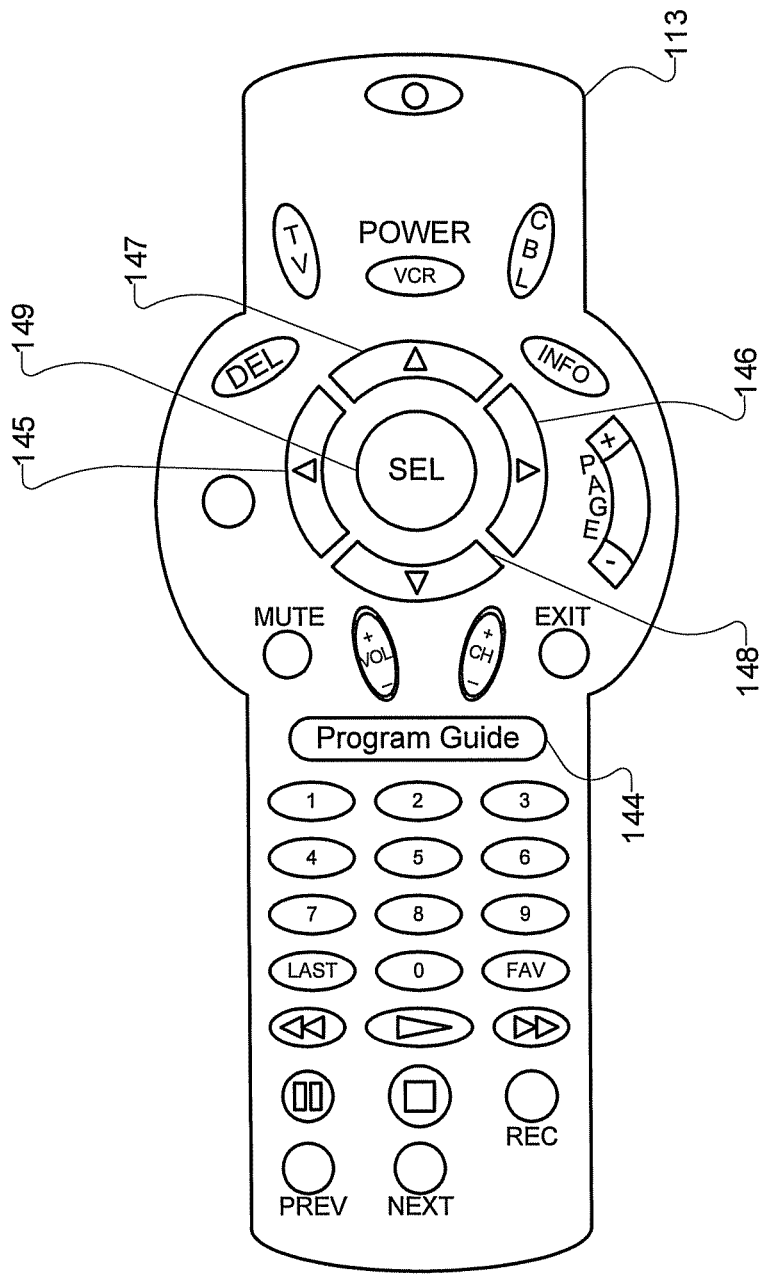
FIG. 4 illustrates an exemplary remote control user input device.

An exemplary remote control user input device 113 is illustrated in FIG. 4. In some examples, the input device 113 may be configured to enable a user to control viewing options for experiencing media content and/or considering program guide data provided by the processing subsystem 110. A program guide button 144 may be configured to evoke the display of a program guide GUI on the display 112. A left button 145, right button 146, up button 147, down button 148, and select button 149 may be included and configured to enable the user to evoke and/or navigate through various views, options, and graphical user interfaces displayed by the display 112. As will be described below, buttons 145-149 may be configured to enable a user to utilize exemplary navigation tools for navigating to different locations in a program guide. It will be recognized that the input device 113 shown in FIG. 4 is merely illustrative of the many different types of user input devices that may be used in connection with the present systems and methods.

Returning to FIG. 3, the processing subsystem 110 may also include an output driver 133 configured to interface with or drive the display 112. As instructed by one or more processors of the processing subsystem 110, the output driver 133 may provide output signals to the display 112, the output signals including content (e.g., media content and/or program guide content) to be presented by the display 112 for experiencing by a user. For example, the output driver 133 may provide a program guide GUI to the display 112 for presentation to the user. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. Media content, program guide data, and other data may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory ("RAM"), dynamic RAM ("DRAM"), or a combination thereof. In some examples, as will be described in more detail below, various applications (e.g., a program guide application 142) used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. In some examples, media content data and/or program guide data may be temporarily stored in the live cache buffer 136 to facilitate viewing of the media and/or program guide content.

3. Tuner

Tuner 137 may be configured to selectively receive content (e.g., media content) carried on a particular content channel. For example, tuner 137 may be tuned to a particular content channel such that the content carried on the content channel is received and can be processed by the processing subsystem 110.

In some examples, the processing subsystem 110 may include multiple tuners 137 such that content carried on different content channels may be concurrently received by the processing subsystem 110. For example, the processing subsystem 110 may include a first tuner configured to receive content carried on an analog video signal and a second tuner configured to simultaneously receive content carried on a digital compressed signal.

In some examples, media content received at the tuner 137 is temporarily buffered, or stored, in the live cache buffer 136. If there are multiple tuners 137, there may be a live cache buffer 136 corresponding to each of the tuners 137.

While tuner 137 may be used to receive various types of content-carrying signals broadcast by media content provider 111, processing subsystem 110 may be configured to receive other types of content signals (including media content signals and/or program guide data signals) from the media content provider 111 without using a tuner. For example, media content provider 111 may broadcast digital streams of data packets (e.g., Internet Protocol ("IP") based data packets) that can be received without using a tuner. For such types of content signals, the communication interface 131 may receive and forward the signals directly to other components of the processing subsystem 110 (e.g., the processor 138 or signal processing unit 139) without going through the tuner 137. For an IP-based signal, for example, the signal processing unit 139 may function as an IP receiver.

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137. Program guide data received from the media content provider 111 may be processed by the signal processing unit 139, the processor 138, and/or any other suitable component(s) of the processing subsystem 110.

The processing subsystem 110 may also include a graphics engine 140 configured to generate graphics that are to be displayed by the display 112. The graphics may include graphical user interfaces such as, but not limited to, one or more program guide GUIS including views of at least portions of program guides (e.g., views of different portions of the program guides), program guide navigation tools, selectable options within the navigation tools for navigating the program guide, navigation palettes including the program guide navigation tools, selectors for navigating and highlighting selectable options, and other graphics.

5. Application Clients

One or more applications residing within the processing subsystem 110 may be executed upon initiation by a user of the processing subsystem 110, or upon the occurrence of another predetermined event. The applications, or application clients, may reside in memory 135 or in any other area of the processing subsystem 110 and be executed by the processor 138.

As shown in FIG. 3, the processing subsystem 110 may include a program guide application 142 residing in memory 135. The program guide application 142 may be configured to instruct components of the processing subsystem 110 (e.g., the processor 138 and/or the graphics engine 140) to generate and provide data representative of a program guide GUI having a view of a program guide, or portion of the program guide, that may be provided for presentation on the display 112. Views of the program guide may be generated from program guide data stored within the processing subsystem 110 (e.g., in the storage device 134) and/or program guide data received from an external source such as the media content provider 111.

The program guide GUI may be configured to support the performance of various functions including enabling a user to provide input, navigate, select, and/or view information and options associated with various media content carriers, media content instances, and navigation tools, as described below.

The program guide application 142 may be launched by receipt of a predetermined user input signal. For example, when a user selects the program guide button 144 of the user input device 113 shown in FIG. 4, the program guide application 142 may launch and instruct the graphics engine 140 to generate a program guide GUI including data representative of a view of at least a portion of a program guide. The program guide GUI may be provided to the output driver 133, which can provide a signal including data representative of the program guide GUI to the display 112 for presentation to the user. As described below, the program guide application 142 may consider other input signals received from the user input device 113 and cause the view of the program guide to be updated accordingly.

The program guide application 142 may be configured to instruct one or more of the components of the processing subsystem 110 to provide one or more program guide navigation tools to the display 112 for presentation in the program guide GUI. The navigation tools may be displayed in the program guide graphical user interface. A user of the processing subsystem 110 can consider and utilize the navigation tools in the program guide GUI to conveniently, intuitively, and selectively navigate through a program guide.

Figure 5:
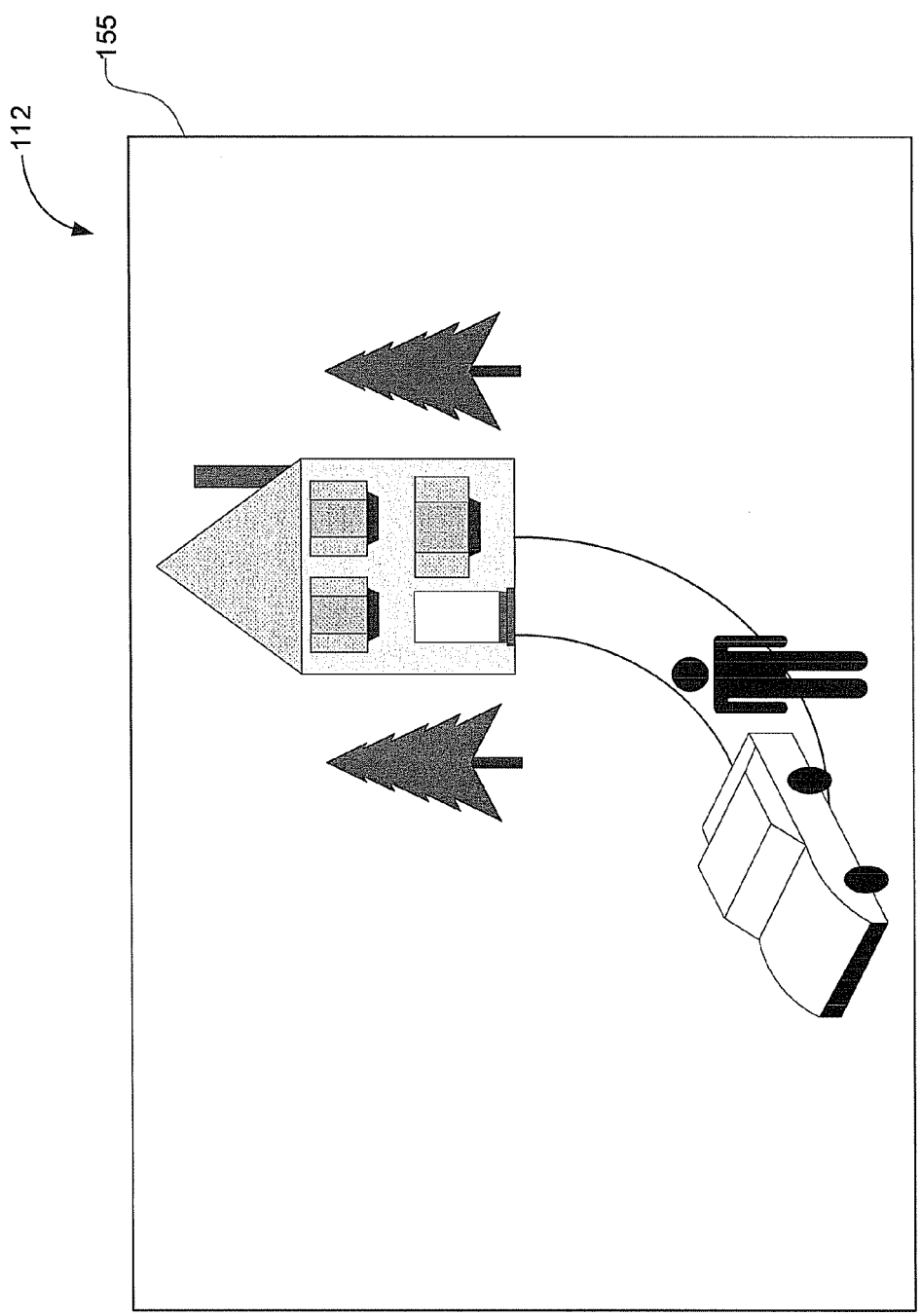
FIG. 5 illustrates a viewing screen of an exemplary display with a particular scene or frame of media content displayed thereon, according to an embodiment.

To facilitate an understanding of the program guide application 142 and exemplary program guide navigation tools, FIGS. 5-19 illustrate various embodiments of views caused to be displayed on a viewing screen of the display 112 by the processing subsystem 110. FIG. 5 illustrates a viewing area or screen 155 of an exemplary display 112 with a particular scene or frame of a media content instance displayed thereon. In some examples, the user may be interested in viewing a program guide GUI in order to view program guide data related to media content instances and/or to access a different media content instance (e.g., by changing channels). The user may provide a predefined command to the processing subsystem 110, the predefined command causing the processing subsystem 110 to generate and provide a program guide GUI to the display 112 for presentation to the user. The predefined command may be sent when the user actuates the program guide button 144 of the user input device 113 of FIG. 4, or when the user provides any other suitable predefined user input.

Figure 6:
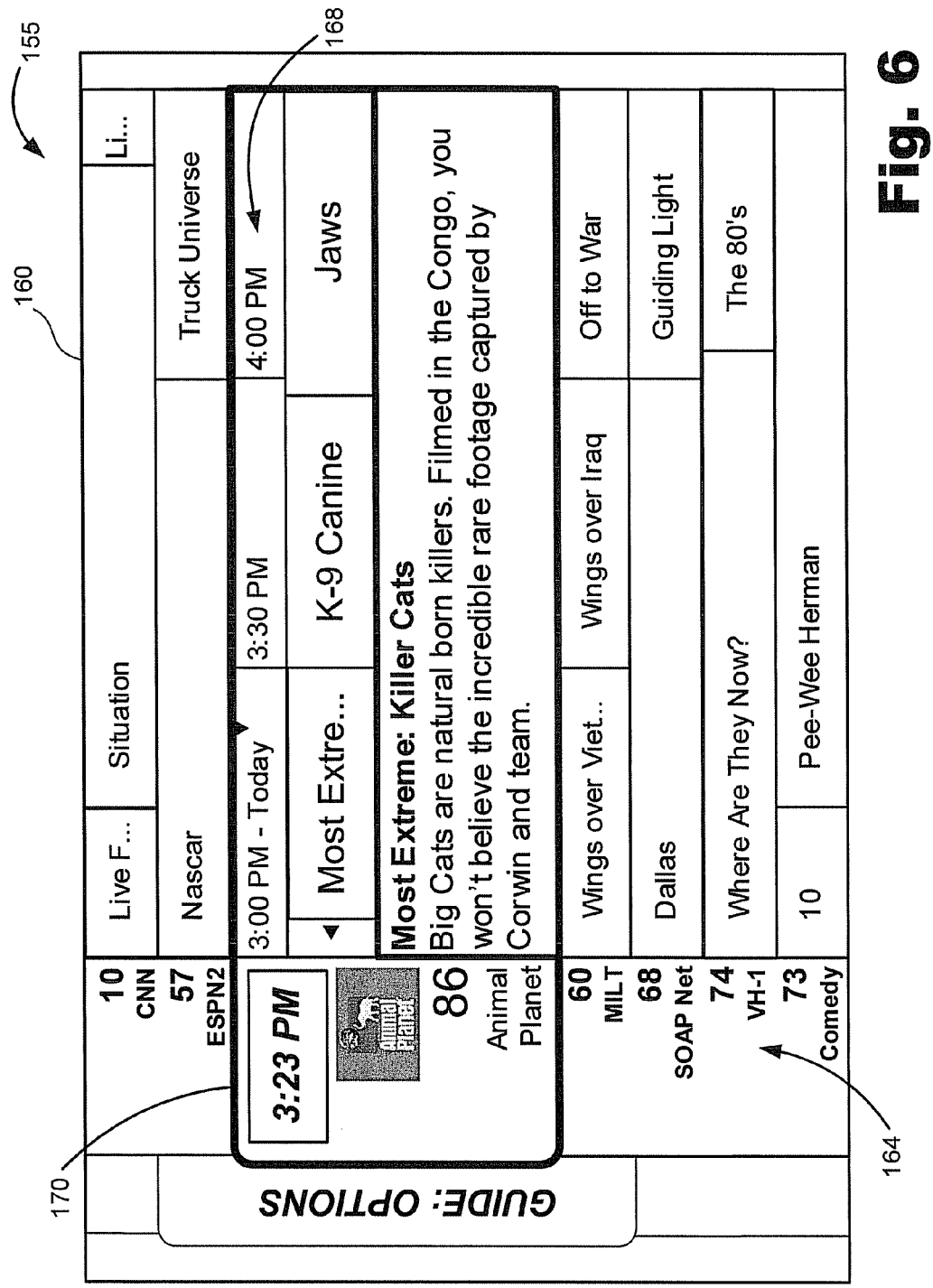
FIG. 6 illustrates an exemplary program guide graphical user interface displayed on the viewing screen of FIG. 5, the program guide graphical user interface including a portion of a program guide.

FIG. 6 illustrates an exemplary program guide graphical user interface ("GUI") 160 that may be displayed on the viewing screen 155 of an exemplary display 112. The processing subsystem 110 may provide a signal carrying data representative of the program guide GUI 160 in response to an occurrence of any predefined event, including the processing subsystem 110 receiving a predefined user input signal, as described above.

The program guide GUI 160 may include a view of at least a portion of a program guide. Typically, the program guide includes information related to content channels, media content instances, and programming time slots, but only a portion of the program guide is presented on the viewing screen 155 at any one time.

As shown in FIG. 6, the program guide GUI 160 may include a list of content channels 164, and a list of programming time slots 168 (or simply "time slots 168"). Although not limiting in any sense, in the example of FIG. 6, the list of content channels 164 is presented vertically and the list of time slots 168 is presented horizontally such that a matrix of cells having respective intersecting content channels and time slots is formed. The cells may be referred to as different locations within the program guide GUI 160.

The cells may be associated with media content instances and associated metadata and programming information. For example, any particular cell may be associated with a content channel and one or more time slots indicative of the channel carrying a media content instance and the time period during which the media content instance is scheduled for broadcast. In FIG. 6, a media content instance titled "DALLAS" is scheduled to be broadcast on a "SOAP Net" content channel from 3:00 PM until 4:00 PM.

The program guide GUI 160 may also include a selector 170 configured to graphically depict which cell of the program guide is currently highlighted. In FIG. 6, a cell associated with a media content instance titled "Most Extreme: Killer Cats" is highlighted by the selector 170. When a cell is highlighted by the selector 170, additional information associated with the cell may be displayed. For example, a synopsis of the "Most Extreme: Killer Cats" media content instance is displayed. The additional information may be obtained from metadata associated with the media content instance.

The selector 170 may be moved from cell to cell in accordance with user input commands. For example, the user may utilize buttons 145-149 of the user input device 113 shown in FIG. 4 to move the selector 170 up, down, left, or right one cell at a time, or to select a highlighted cell. When a highlighted cell is selected, the media content instance corresponding with the cell may be presented to the user.

The lists of content channels 164 and time slots 168 shown in FIG. 6 are typically only a subset of the content channels and time slots associated with the full program guide. Accordingly, the user may move the selector 170 to cells not included in the view shown in FIG. 6. For example, the up arrow button 147 of the user input device 113 shown in FIG. 4 may be used to scroll the selector upward through the list of content channels 164. The view shown in the program guide GUI 160 may be updated accordingly as the selector 170 is scrolled upward.

Because the view shown in FIG. 6 usually includes only a relatively small subset of program guide data, it can be time-consuming for a user to scroll the selector 170 through the all of the content channels included in a program guide. The processing subsystem 110 may be configured to provide advanced navigation tools to the user, which tools can enable the user to selectively navigate to various locations in the program guide.

Figure 7:
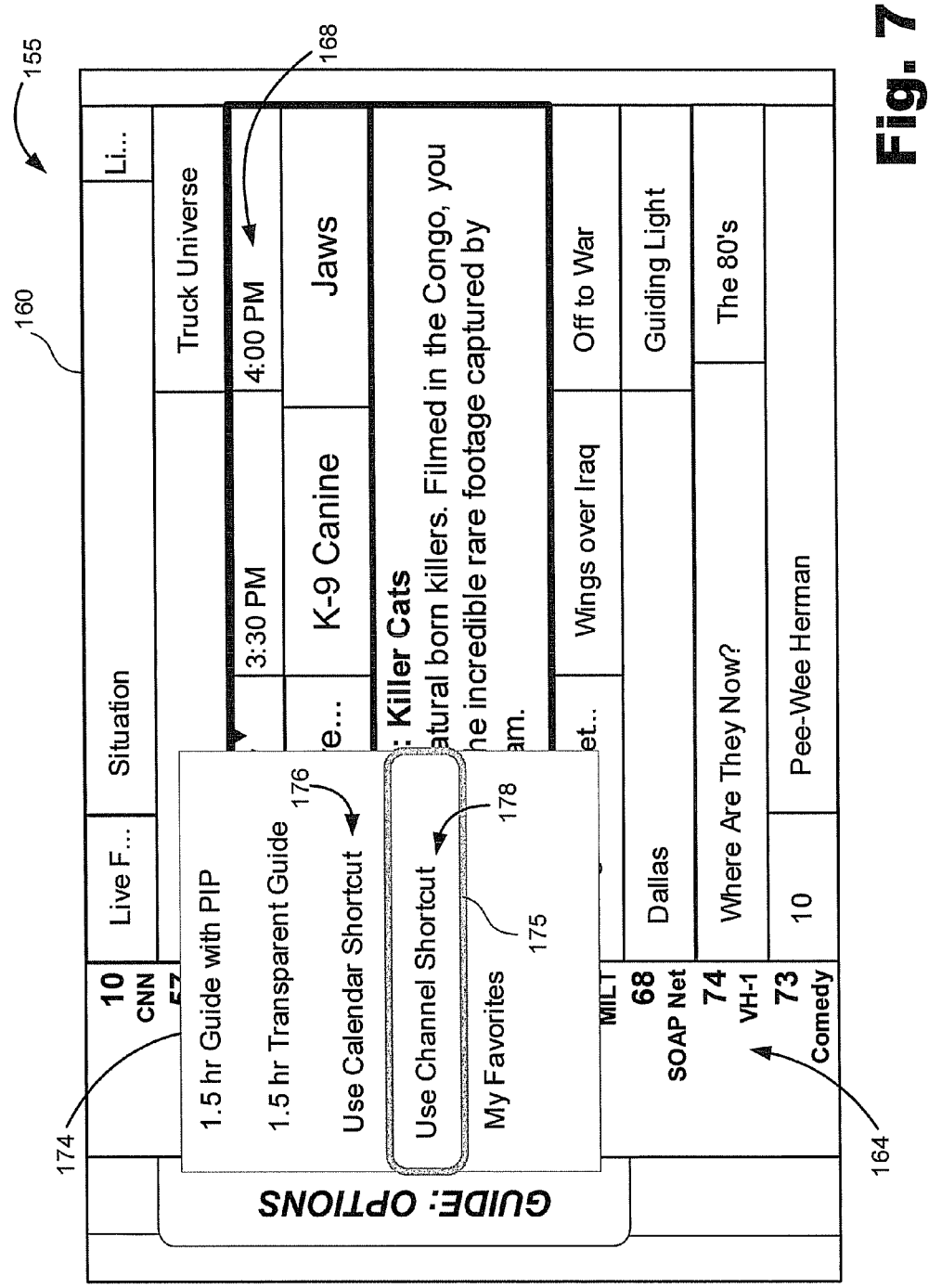
FIG. 7 illustrates the program guide graphical user interface of FIG. 6 with an exemplary navigation palette displayed therein.

FIG. 7 illustrates the program guide GUI 160 of FIG. 6 with an exemplary navigation palette 174 displayed therein. The navigation palette 174 may be launched in response to the processing subsystem 110 detecting an occurrence of a predetermined event. The predetermined event may include receipt of any suitable predefined user input. For example, when viewing the program guide GUI 160 of FIG. 6, a user may actuate a predetermined button on the user input device 113 to cause the navigation palette 174 to launch.

The navigation palette 174 may include one or more selectable options and a selector 175 for navigating and selecting from the selectable options. A user may move the selector 175 using any suitable input commands. In some embodiments, for example, when the navigation palette 174 is "active," the user may control the selector 175 with buttons 145-149 of the user input device 113 shown in FIG. 4.

Figure 16:
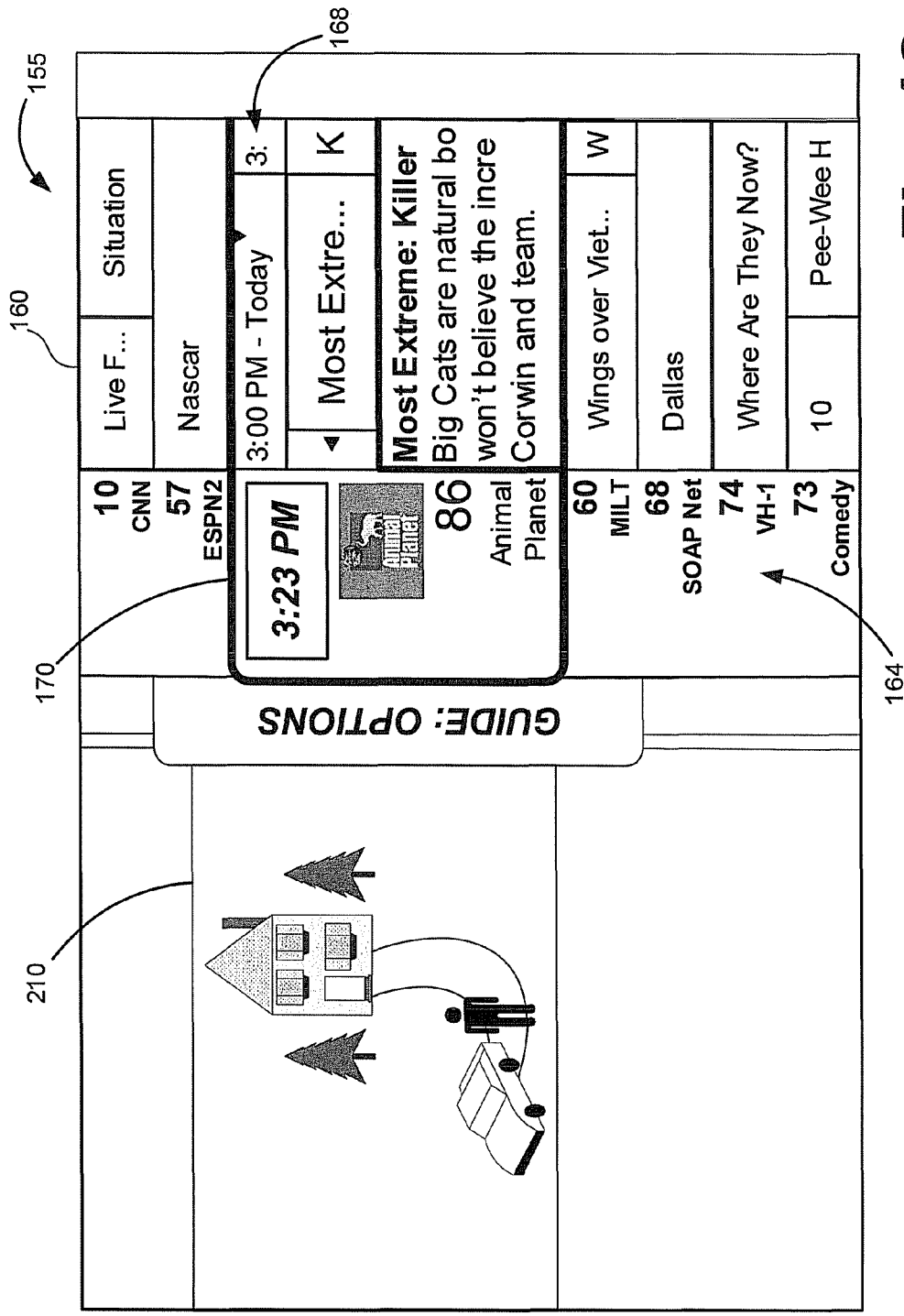
FIG. 16 illustrates another exemplary program guide graphical user interface displayed on a viewing screen of an exemplary display.

The selectable options may include program guide options and/or navigation tool options for navigating the program guide. As shown in FIG. 7, the selectable options may include a "1.5 hour program guide with picture-in-picture" option, a "1.5 hour transparent program guide" option, a "calendar shortcut" option 176, a "channel shortcut" option 178, and a "my favorites" option. Selection of the "my favorites" option may cause the view of the program guide GUI 160 to update to include only content channels that have be pre-selected by a user to be included in a list of user favorites. Selection of the "transparent program guide" option may cause the view of the program guide GUI 160 to be shown transparently as an overlay to a display of a media content instance. Selection of the "program guide with picture-in-picture" option may cause the program guide GUI 160 to be shown on a subset area of the viewing screen 155 while a media content instance is concurrently displayed on another subset area of the viewing screen 155. For instance, the program guide GUI 160 and the display of the media content instance may each occupy different halves of the viewing screen 155, such as is illustrated in FIG. 16.

Selection of the "calendar shortcut" option 176 or the "channel shortcut" option 178 may cause the processing subsystem 110 to launch a calendar navigation tool or a channel navigation tool, respectively. Exemplary calendar and channel navigation tools will now be described in relation to FIGS. 8-15.

Figure 8:
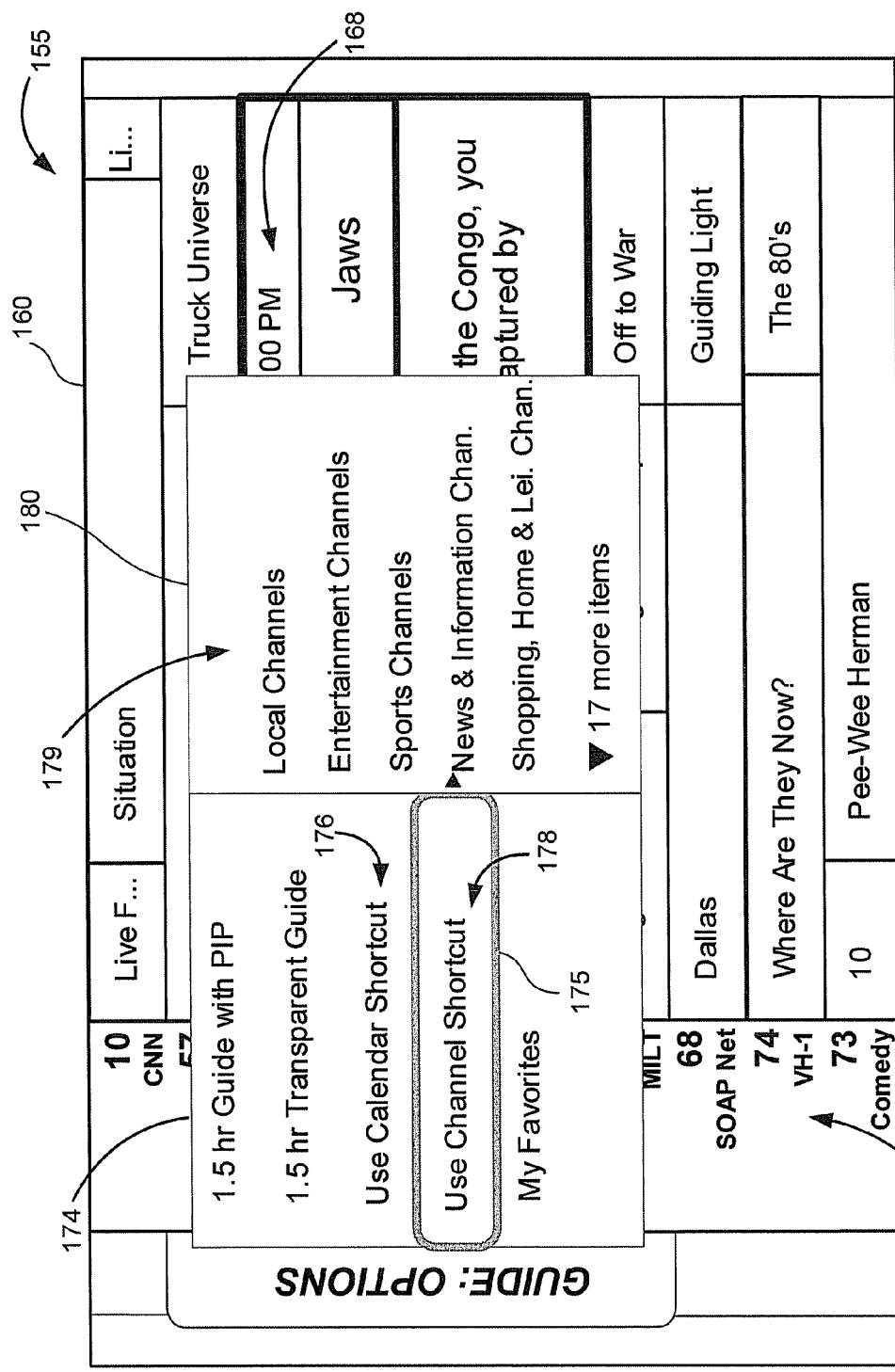
FIG. 8 illustrates the program guide graphical user interface of FIG. 7 with the navigation palette expanded to include an exemplary content channel navigation tool.

When a user highlights or selects the "channel shortcut" option 178 shown in FIG. 7, the navigation palette 174 may expand to include a channel navigation tool, which is represented as reference number 179 in FIG. 8. In certain embodiments, an extension pane 180 including the channel navigation tool 179 may be displayed to allow the user to preview the options from which the user can select when the "channel shortcut" option 178 is selected. In other embodiments, the extension pane 180 is configured to be displayed when the user selects the "channel shortcut" option 178.

The channel navigation tool 179 provided in the extension pane 180 may include one or more selectable options that are associated with content channels in the program guide. The selectable options of the channel navigation tool 179 may be displayed in the extension pane 180 of the navigation palette 174 of the program guide GUI 160. In the example of FIG. 8, the selectable options include groupings of content channels. The channel groupings may include any suitable grouping of content channels, including, but not limited to, local channels, entertainment channels, sports channels, news and information channels, shopping, home, and leisure channels, or any other grouping of multiple channels into one selectable option.

As shown in FIG. 8, the selectable options actually displayed in the extension pane 180 at any one time may be a subset of the selectable options available for selection in the extension pane 180. The extension pane 180 may include one or more indicators of the availability of off-screen selectable options. In FIG. 8, an indicator shows that seventeen (17) off-screen options are included in the extension pane 180.

Figure 9:
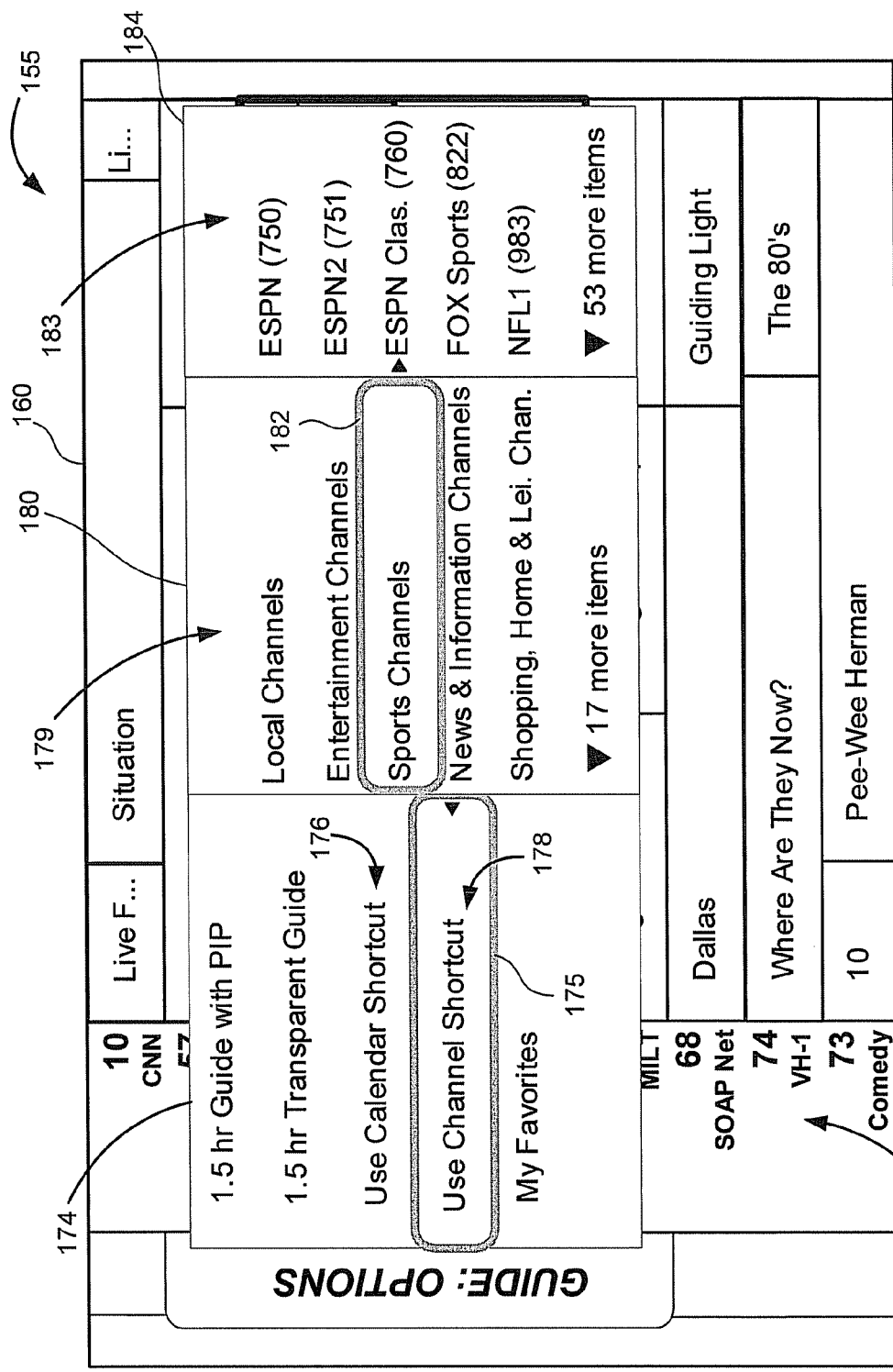
FIG. 9 illustrates the program guide graphical user interface of FIG. 8 with the navigation palette expanded again to include another exemplary channel navigation tool.

When the extension pane 180 of the navigation palette 174 is "active," a user may navigate and select from the channel grouping options included therein. FIG. 9 illustrates the navigation palette 174 with the extension pane 180 in an active mode. In the active mode, the extension pane 180 includes a selector 182 that can be used to highlight and select any of the selectable channel grouping options included the extension pane 180.

In FIG. 9, a "sports channels" channel grouping option is highlighted. When this option is highlighted (or selected in alternative embodiments), the navigation palette 174 may be expanded again to include an additional exemplary channel navigation tool, which is represented as reference number 183 in FIG. 9. The additional navigation tool 183 may be included in another extension pane 184. As shown in FIG. 9, the additional navigation tool 183 may include selectable options associated with individual content channels.

The individual channel options included in the additional extension pane 184 may be selected and displayed based on the channel grouping option highlighted in the extension pane 180. For example, with the "sports channels" option highlighted in the extension pane 180, the selectable channel options in the additional extension pane 184 of FIG. 9 include individual channels associated with sports-related media content.

The navigation tool 179 included in extension pane 180 and the additional navigation tool 183 included in extension pane 184 may be collectively referred to as channel navigation tools. In certain embodiments, each of the channel navigation tools is configured to provide a user with a distinct way to navigate the selector 170 shown in FIG. 6 to different content channels in the program guide. In particular, one set of options enables selection of and navigation to a group of content channels and the other set of options enables selection of and navigation to an individual content channel.

With the selector 182 highlighting one of the channel grouping options included in the extension pane 180, a user may select the highlighted channel grouping option in one or two ways. The first type of selection may be configured to initiate a navigation to (e.g., jump the selector 170 to) a pre-selected content channel included in the channel grouping associated with the channel grouping option. The second type of selection may make the extension pane 184 "active" such that the user can select an individual channel option included in the extension pane 184. A different user input command may be associated with each type of selection. In some embodiments, for example, the user may jump the selector 170 to a highlighted channel grouping by actuating the "SELECT" button 149 of the user input device 113 shown in FIG. 4, or the user may move control to the additional extension pane 184 by actuating the right arrow button 146 of the user input device 113 shown in FIG. 4.

Accordingly, if a user is interested in browsing sports channels, the user may wish to select the "sports channels" option to jump to a grouping of sports channels. The grouping may include sports channels that have been organized sequentially in the program guide or a filtered grouping of sports channels. Accordingly, an updated view of a portion of the program guide including sports channels may be presented to the user.

Figure 10:
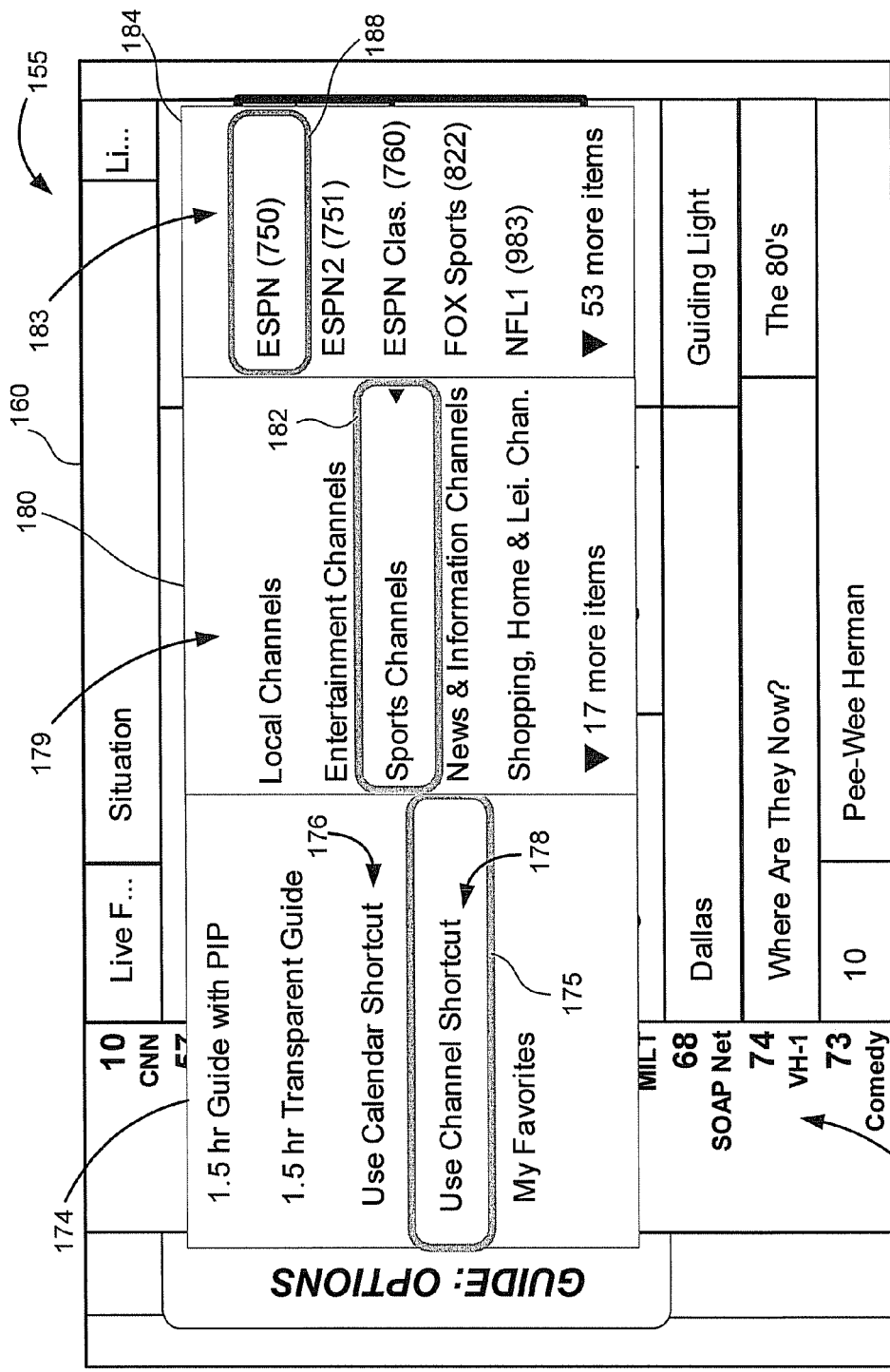
FIG. 10 illustrates an exemplary selection of one of the selectable options included in the exemplary channel navigation tool of FIG. 9.

On the other hand, a user may wish to select a particular sports channel. In this case, the user may select to move control to the extension pane 184 so that he or she can select from the individual sports channel options included in the additional extension pane 184. When this type of selection of a channel grouping option is made, the additional extension pane 184 may become active as shown in FIG. 10, meaning that the user can utilize a selector 188 included in the additional extension pane 184 to navigate and select from individual content channel options. As shown in FIG. 10, the extension pane 184 may include selectable options in the form of individual content channel options identified by their respective names and channel numbers. In FIG. 10, the selector 188 is highlighting a content channel option titled "ESPN" and having a channel number of seven hundred and fifty (750).

Figure 11:
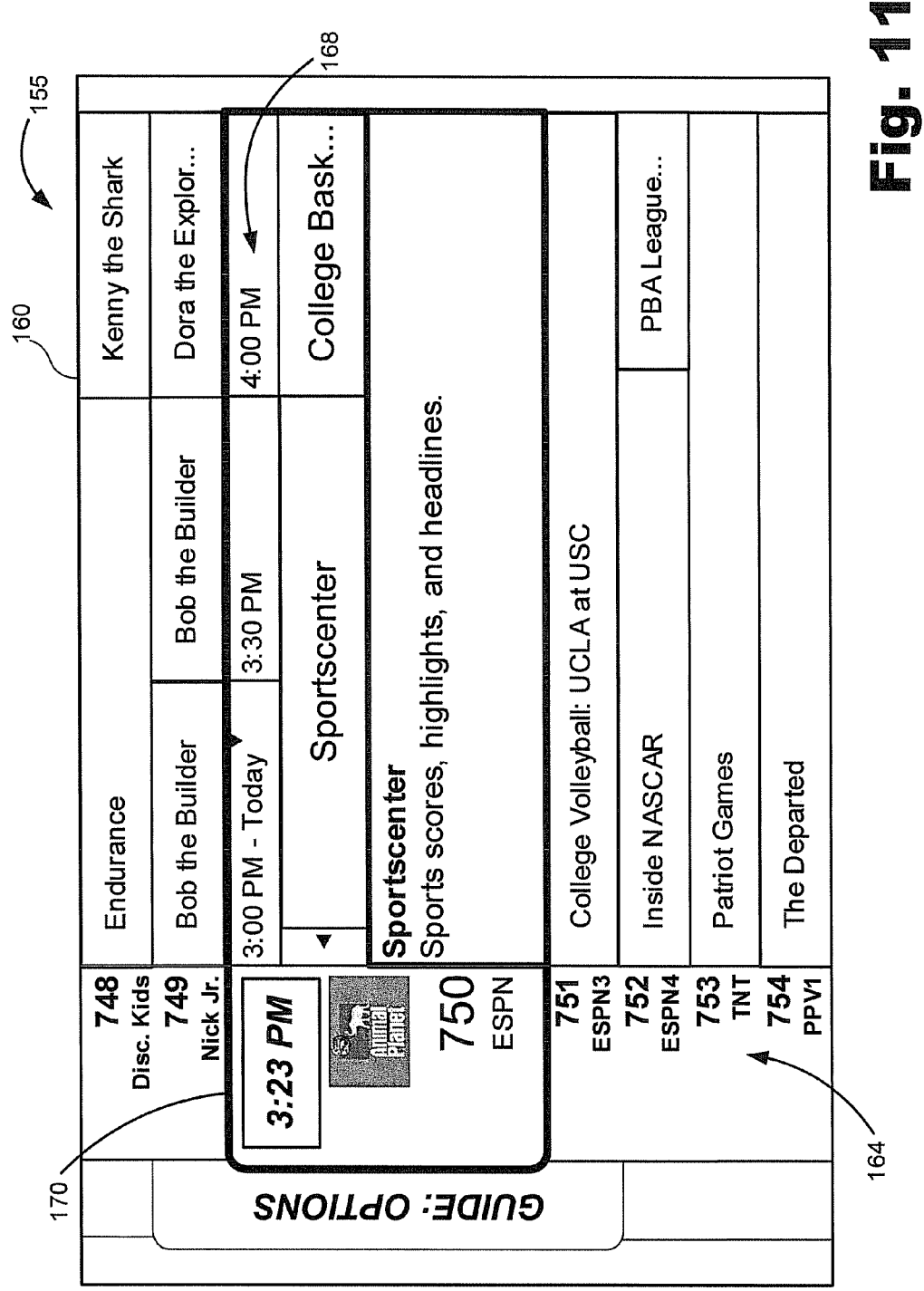
FIG. 11 illustrates the program guide graphical user interface of FIG. 6, with another portion of a program guide displayed in response to the selection shown in FIG. 10.

The user may select the highlighted content channel option to cause the selector 170 to jump to the associated content channel in the program guide. FIG. 11 illustrates the program guide GUI 160 with another portion of the program guide displayed therein, the other portion including the content channel associated with the selected content channel option. The view of FIG. 11 may be presented in response to the selection of the "ESPN" content channel option shown in FIG. 10. As shown in FIG. 11, the selector 170 has been caused to jump from content channel eighty-six (86) (see FIG. 6), which may be referred to as the origin channel, to content channel seven hundred and fifty (750), which may be referred to as the destination channel, based on a user selection of a selectable option included in a channel navigation tool. The processing subsystem 110 may be configured to update the program guide view to reflect the jump to another location in the program guide.

As shown in FIG. 11, the selector 170 has been moved to another location within the program guide. The location (e.g., cell) is associated with the destination content channel and the same time slot that was associated with the origin content channel. That is, the time slot column has been kept constant, and the jump has been made by moving the selector 170 to a different content channel row.

With the channel navigation tools described above, a user is able to intuitively navigate to various locations in a program guide by choosing from selectable options displayed in the program guide GUI, the selectable options being associated with content channels in the program guide. A selection of one of the options will initiate a jump to another location in the program guide. In this manner, a user can easily find and jump to any channel in the program guide. Significantly, with the exemplary channel navigation tools described herein, the ability of the user to navigate within the program guide is not limited by the sequential ordering of content channels or by the current location of the selector 170 in the program guide.

In addition or alternative to the channel navigation tools described above, the processing subsystem 110 may be configured to provide one or more time-based navigation tools. A time-based navigation tool generally enables the user to cause the selector 170 of the program guide GUI 160 to be moved forward or backward in time (i.e., along a list of time slots) in a program guide. The time-based navigation tools may include a calendar navigation tool for navigating the selector 170 in accordance with user selections of selectable calendar day options. However, this is not limiting. Other time-based navigation tools may be provided for navigating to different time locations and by different time increments within the program guide.

Figure 12:
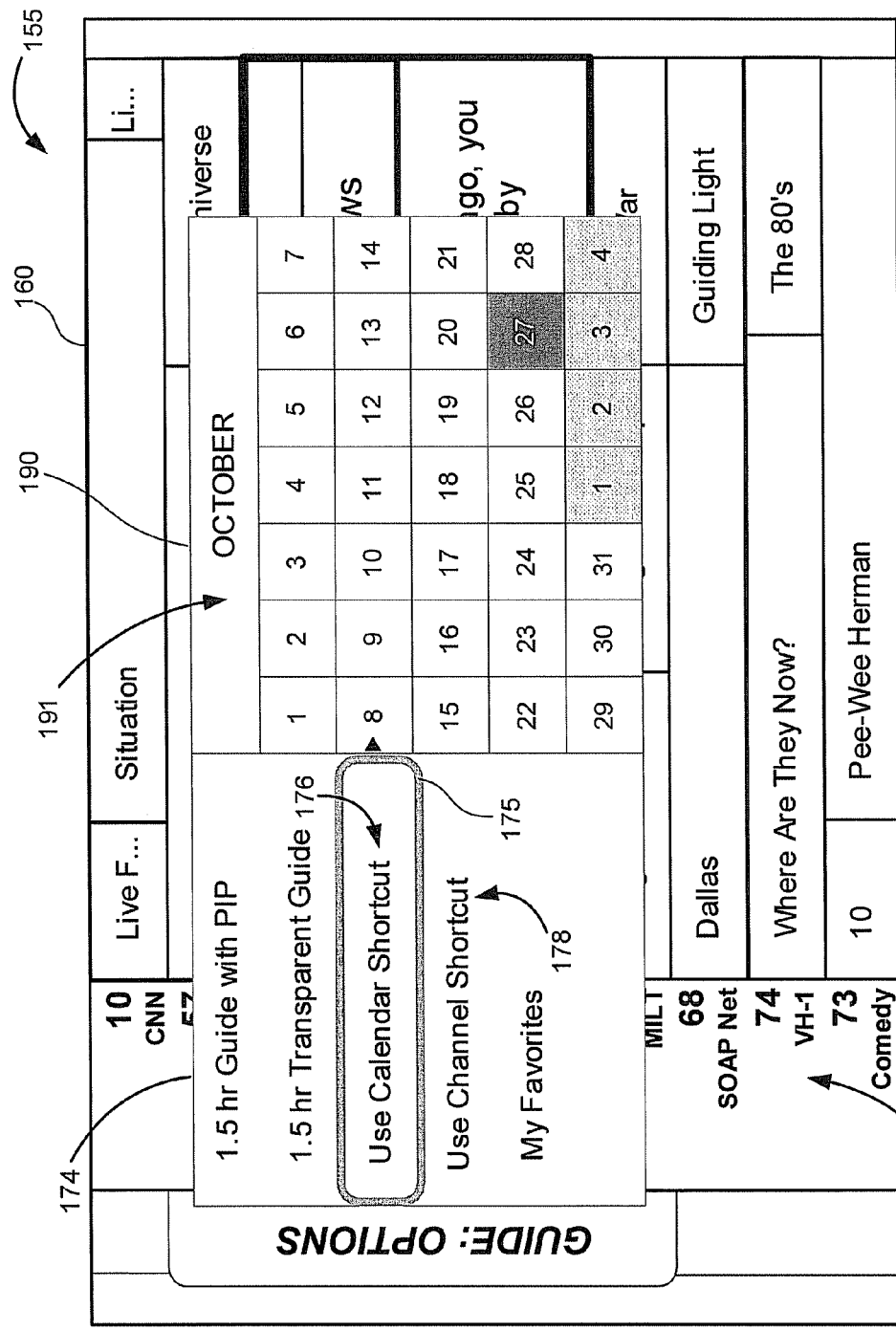
FIG. 12 illustrates the program guide graphical user interface of FIG. 7 with the navigation palette expanded to include a calendar navigation tool.

If a user highlights or selects the "calendar shortcut" option 176 instead of the "channel shortcut" option 178 when the view of FIG. 7 is being presented, the navigation palette 174 may be expanded to include an extension pane 190 including a calendar navigation tool 191, as shown in FIG. 12. In certain embodiments, the calendar navigation tool 191 is shown as a preview when the "calendar shortcut" option 176 is highlighted. The extension pane 190 may become "active" when the user selects the "calendar shortcut" option 176. Of course, the calendar navigation tool 191 may be launched in response to an occurrence of any suitable predefined event.

As shown in FIG. 12, the calendar navigation tool 191 may include a monthly calendar in which each day is a selectable option. In the extension pane 190, the current day may be distinguished from other days such as by using a distinct shade for the current day. Other distinctions may also be made between the different selectable day options. For example, days outside of the current month (October in FIG. 12) may be distinguished. Again, a distinguishing shade may be used. By way of another example, days in the future may be distinguished from days in the past by distinct shades or another distinguishing feature.

Figure 13:
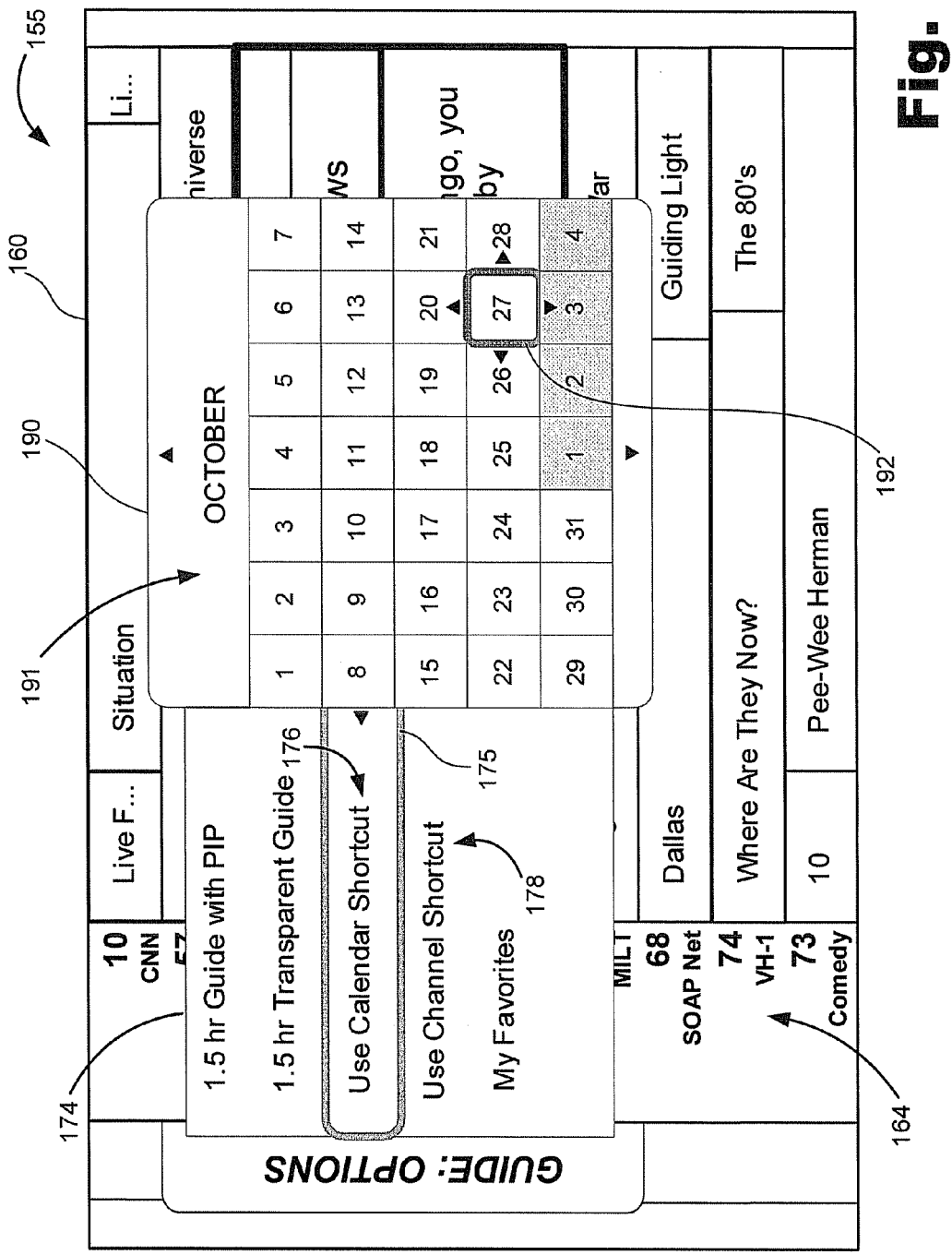
FIG. 13 illustrates the program guide graphical user interface of FIG. 12 and an exemplary calendar day selector displayed therein.

FIG. 13 illustrates the extension pane 190 in an active mode. When active, the extension pane 190 may include a selector 192 that can be controlled by a user to navigate and choose from the selectable calendar day options included in the calendar navigation tool 191. The selector 192 may be moveable in up, down, right, and left directions as may be indicated by the arrows located around the selector 192 in FIG. 13. Accordingly, the arrow buttons 145-148 of the user input device 113 shown in FIG. 4 may be used to navigate the selectable calendar day options of the calendar navigation tool 191. The "SELECT" button of the user input device 113 may be used to select any of the calendar day options.

The calendar day options actually displayed in the extension pane 190 may be only a subset of the selectable options available in the extension pane 190. Accordingly, the view within the extension pane 190 may be updated as the selector 192 is moved to or toward off-screen calendar day options. For example, the selector 192 may be moved downwardly from October 27$^{th}$ to November 3$^{rd}$ (to see what is scheduled for broadcast one week in advance, for example), and the view in the extension window 190 may be updated to show November calendar days, as illustrated in FIG. 14.

Figure 14:
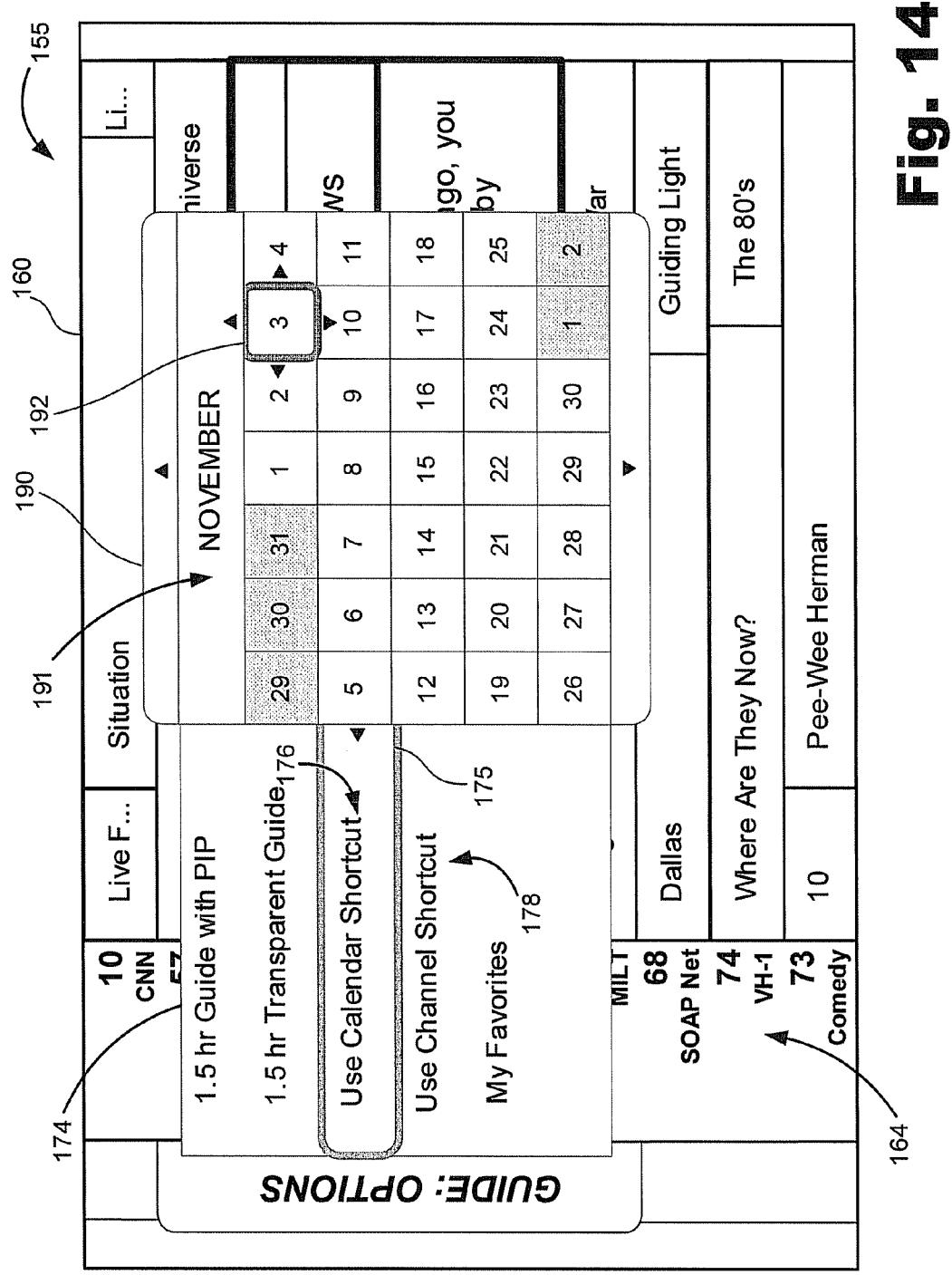
FIG. 14 illustrates an exemplary selection of one of the selectable options included in the calendar navigation tool of FIG. 12.

In the example shown in FIG. 14, selection of the highlighted November 3$^{rd}$ calendar day option may be configured to cause the selector 170 of the program guide GUI 160 to jump forward one week from the origin location. The processing subsystem 110 may provide an updated view in the program guide GUI 160 based on the user selection of the November 3$^{rd}$ calendar day option. FIG. 15 illustrates an updated program guide view that may be displayed in the program guide GUI 160 response to the user selection of the November 3$^{rd}$ calendar day option. As shown in FIG. 15, the content channel may be kept constant while the selector 170 is moved along the list of time slots 168 in the program guide to the same time of day (3:00 PM) one week in advance of the origin calendar day. As shown in FIG. 15, the destination cell of the program guide is associated with content channel eighty-six and a time slot of 3:00 PM on Friday, November 3$^{rd}$.

With the calendar navigation tool 191 described above (or other time-based navigation tool), a user is able to intuitively navigate and choose from displayed selectable options, a selection of which will initiate a navigation to another location in the program guide. In this manner, a user can easily find and jump to any calendar day and associated time slot in the program guide. The calendar navigation tool may be especially useful for a processing subsystem 110 that is capable of receiving and/or storing program guide data that covers a significant time period. As with the channel navigation tools, a time-based navigation tool does not allow the sequential order of time slots or the current position of the selector 170 to limit the ability of the user to navigate to various locations in a program guide.

The above-described exemplary navigation tools may be used in any suitable program guide and in various presentations of program guide data. For example, while FIGS. 12-14 illustrate an exemplary calendar navigation tool presented in association with a substantially full-screen program guide view, the calendar navigation tool may be adapted for use with other presentations of program guide data, including views having more limited screen space. By way of an example, FIGS. 16-20 illustrate use of the calendar navigation tool 191 in a half-screen program guide view. This enables a media content instance to be presented (by picture-in-picture for example) concurrently with program guide data. As shown in FIG. 16, the program guide GUI 160 may include the information shown in FIG. 6 but shifted to one side of the viewing screen 155 to make space for a media content picture-in-picture display.

Figure 17:
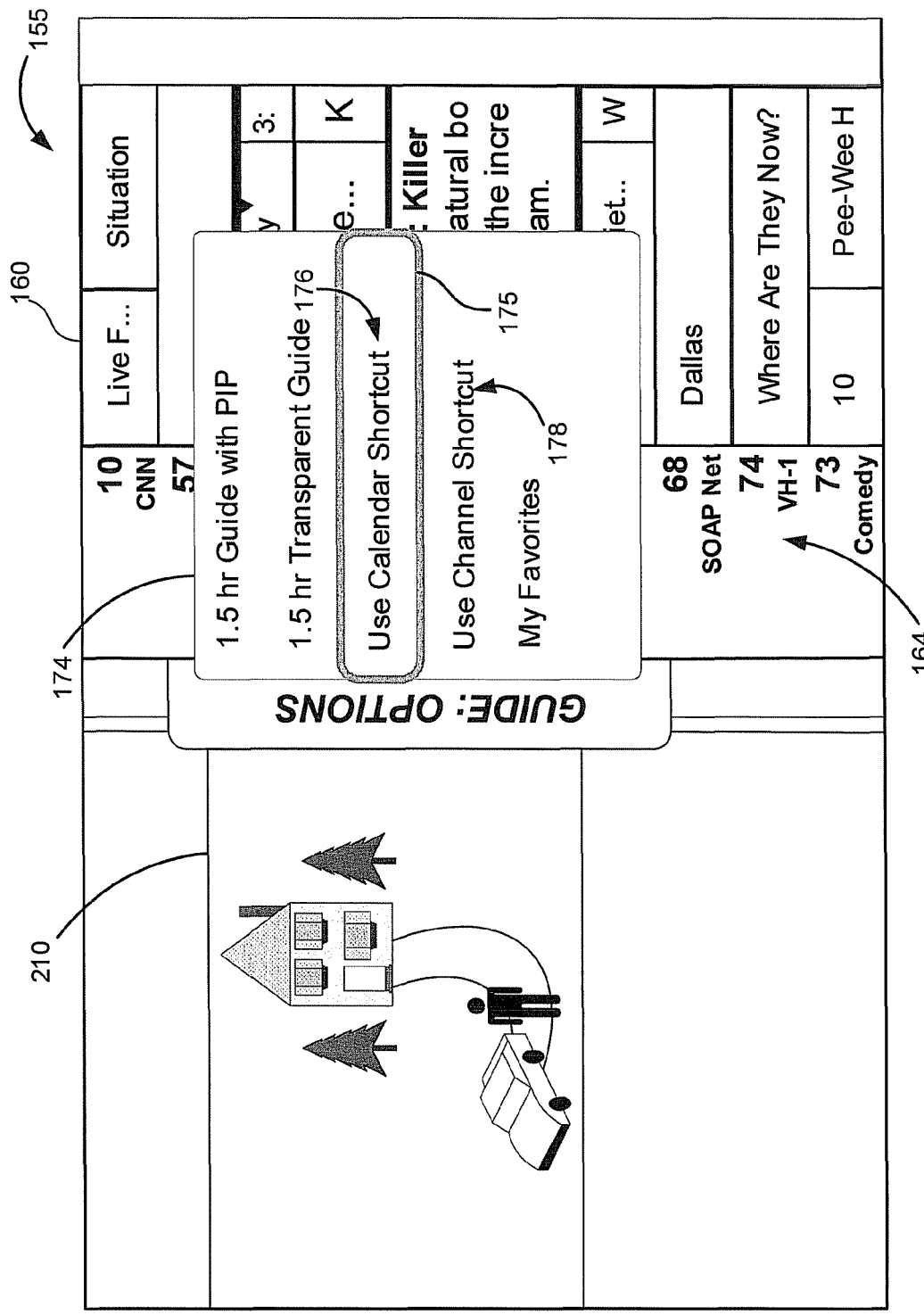
FIG. 17 illustrates the program guide graphical user interface of FIG. 16 with an exemplary navigation palette displayed therein.
Figure 18:
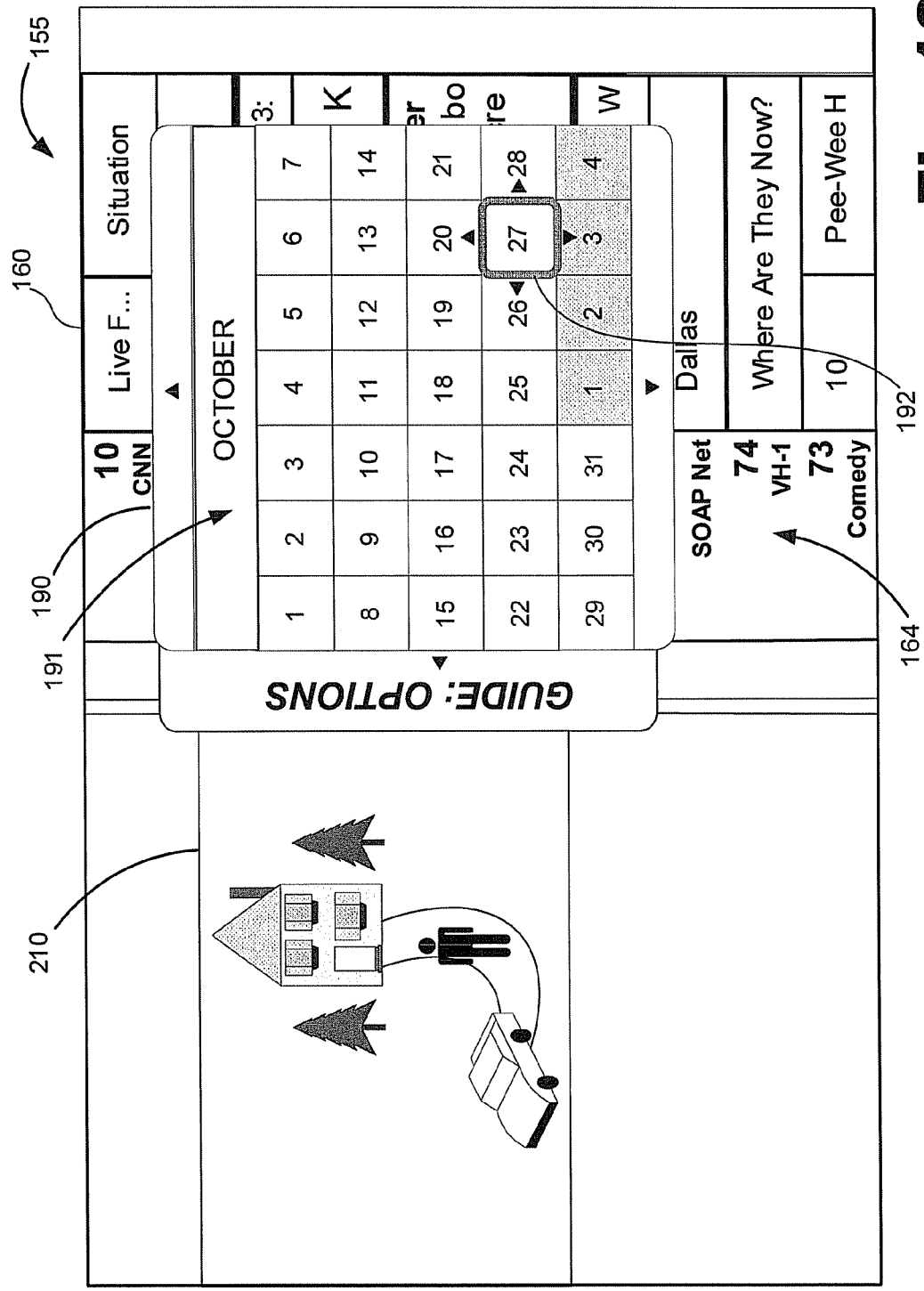
FIG. 18 illustrates the program guide graphical user interface of FIG. 17 with an exemplary calendar navigation tool displayed therein.
Figure 19:
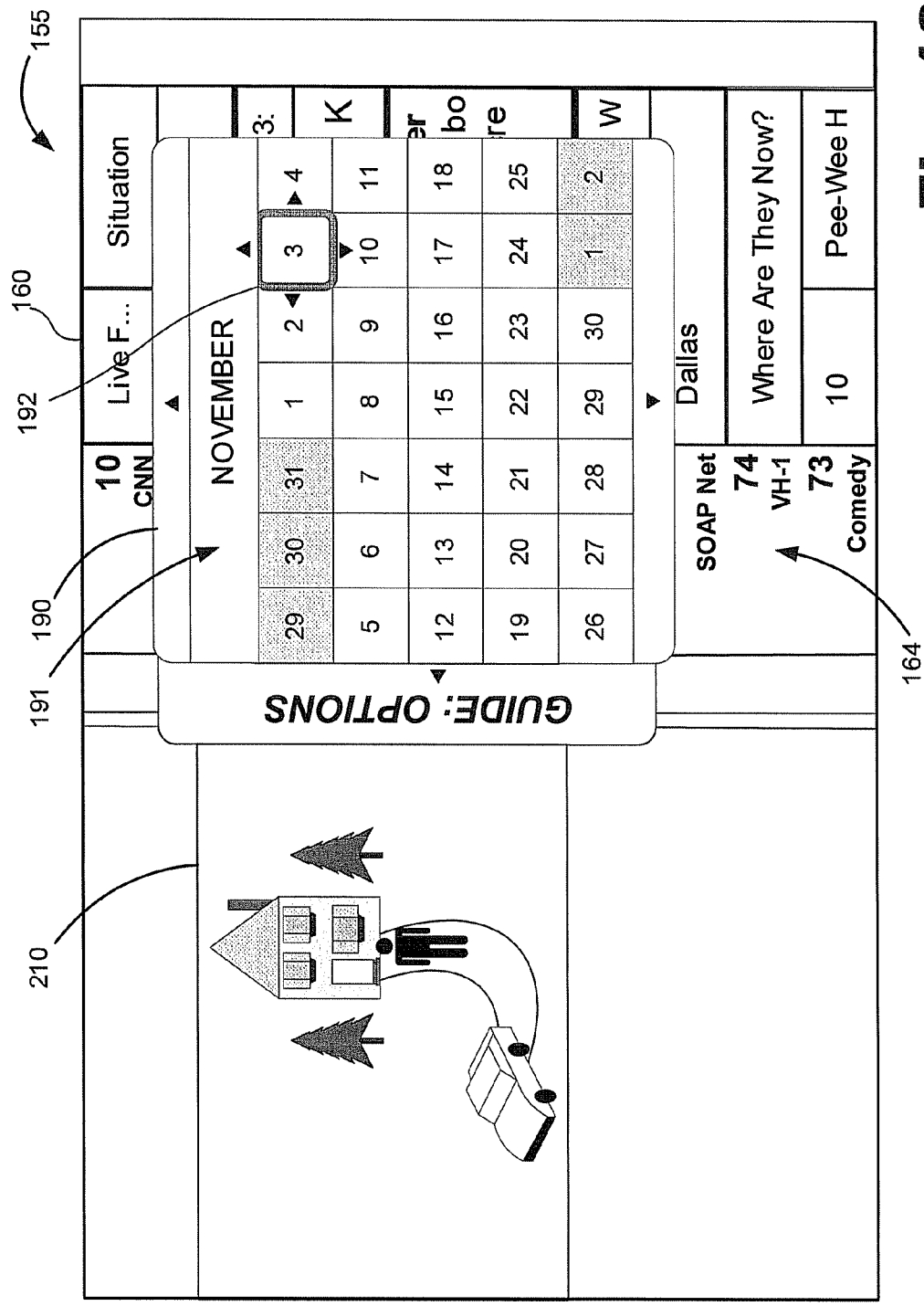
FIG. 19 illustrates an exemplary selection of one of the selectable options included in the calendar navigation tool.
Figure 20:
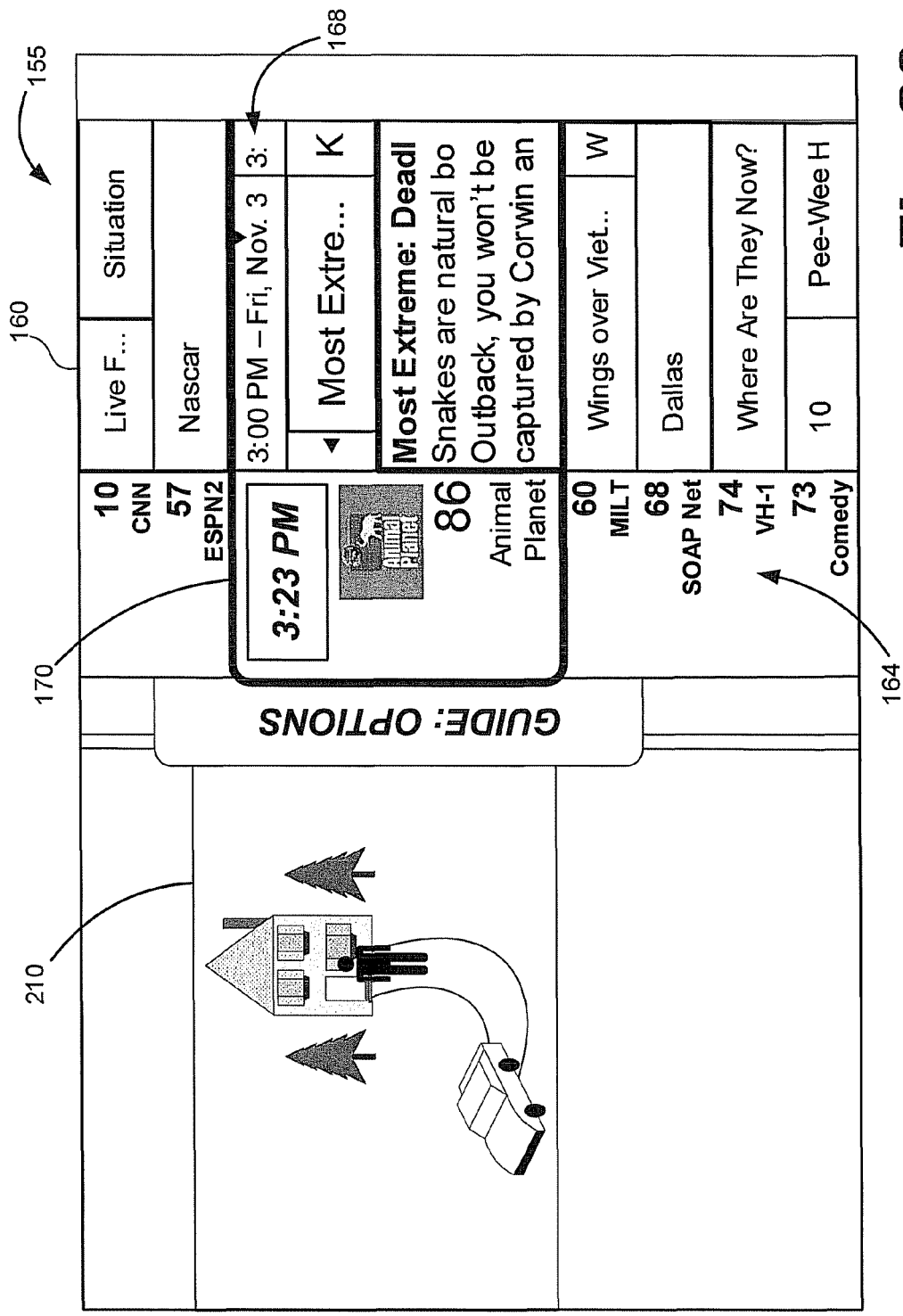
FIG. 20 illustrates the program guide graphical user interface of FIG. 16, with another portion of a program guide displayed in response to the selection shown in FIG. 19.

From the view shown in FIG. 16, a user may launch the navigation palette 174 in the same or similar manner as described above. The navigation palette 174 may be displayed as shown in FIG. 17. When the user selects the "calendar shortcut" option 176 from the selectable options included in the navigation palette 174, a calendar navigation tool 191 may be displayed, as shown in FIG. 18. Instead of extending the navigation pane 174 to one side to make space for the calendar navigation tool 191, the navigation pane 174 may be expanded in the depth direction such that the extension pane 190 overlays the first pane of the navigation palette 174. The calendar navigation tool 191 may be used as described above to select a calendar day option (e.g., November $3^{rd}$ as shown in FIG. 19) using selector 192 to cause the underlying selector 170 to jump to a different location in the program guide, such as is shown in FIG. 20, where the selector 170 has been moved to a program guide cell associated with content channel eighty-six (86) and the Friday, November $3^{rd}$, 3:00 PM time slot. In certain embodiments, a selection of the November $3^{rd}$ calendar day shown in FIG. 19 will cause the selector 170 to jump forward from the origin time slot (e.g., 3:00 pm on October $27^{th}$) along the list of time slots 168 and land on a destination time slot (e.g., 3:00 pm on November $3^{rd}$). The destination time slot may be the same time of day (e.g., 3:00 pm) in the destination day as was selected in the origin day.

Any of the navigation tools described herein may be associated with and launched as described above or in response to a user navigating to a predetermined location within a program guide, including an endpoint of a linear program guide such as the exemplary linear program guide described in co-pending U.S. patent application Ser. No. 11/614,604, entitled "Linear Program Guide For Media Content Access Systems and Methods," filed the same day as the present application and hereby fully incorporated herein by reference in its entirety.

III. Exemplary Process View

FIG. 21 illustrates an exemplary method of navigating a program guide. While FIG. 21 illustrates exemplary steps according to one embodiment, other embodiments may omit, add to, reorder, and/or modify any of the steps shown in FIG. 21.

In step 310, a program guide graphical user interface ("GUI") is provided for display. Step 310 may be performed in any of the ways described above. For example, a processing subsystem 110 may provide the program guide GUI to a display 112 for presentation to a user. As described above, the program guide GUI 160 may include at least a portion of a program guide having a list of content channels, a list of time slots, and media content instances associated with the content channels and time slots.

In step 320, at least one navigation tool is provided for display in the program guide GUI, the navigation tool including a plurality of selectable options. Step 320 may be performed in any of the ways described above. For example, processing subsystem 110 may provide the navigation tool to the display 112 for presentation to the user. The at least one navigation tool may include a time-based navigation tool (e.g., calendar navigation tool 191) and/or channel navigation tools 179 and/or 183. As described above, the user may navigate and select from the selectable options.

In step 330, a user selection of one of the selectable options is detected. Step 330 may be performed in any of the ways described above, including the receiver 132 of the processing subsystem 110 receiving a user input signal from a user input device 113 and the processing subsystem 110 recognizing the user input signal as a selection of the selectable option.

In step 340, a navigation to a location in the program guide is initiated based on the selected option. Step 340 may be performed in any of the ways described above, including the processing subsystem 110 moving a selector 170 from an origin location to a destination location in the program guide, the destination location being associated with the selected option. As used herein, "moving the selector 170" may include any suitable manner of associating the selector 170 with a destination location in the program guide, including the program guide being moved, re-rendered, or otherwise adjusted such that the destination location is identified by (e.g., located within) the selector 170.

IV. Alternative Embodiments

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A system comprising:
a media content processing subsystem configured to provide a program guide graphical user interface to a display for presentation to a user, the program guide graphical user interface displaying a portion of a program guide;
wherein said media content processing subsystem is further configured to provide at least one navigation tool overlaid on a portion of the program guide graphical user interface, the at least one navigation tool including a plurality of selectable options configured to change a focus of a selector to a new location in the program guide, said media content processing subsystem being configured to detect an event indicating a selected option from the plurality of selectable options and initiating a navigation to the new location in the underlying program guide based on the selected option;
wherein the program guide includes a plurality of content channels and a plurality of content channel groupings; and
wherein the plurality of selectable options includes a plurality of content channel grouping options where each of the content channel grouping options are associated with a pre-selected content channel included in the grouping of content channels, and where the navigation to the new location in the underlying program guide for when the plurality of content channel grouping option is selected includes said media content processing subsystem changing the focus of the selector in response to receiving a first selected option and a second selected option, where the first selected option is associated with a selected category and the second selected option is associated with a selected channel in the selected category.

2. The system of claim 1, wherein the program guide further includes a plurality of time slots forming a matrix of cells with the plurality of content channels, and a plurality of media content instances associated with at least a subset of the cells, where changing the focus of the selector includes changing the focus of the selector from one of the cells to another cell in the program guide in response to receiving the second selected option.

3. The system of claim 1, wherein the at least one navigation tool includes at least one channel navigation tool.

4. The system of claim 1, wherein the plurality of selectable options includes a plurality of individual content channel options.

5. The system of claim 1, wherein each of the individual content channel options is associated with an individual content channel included in the program guide.

6. The system of claim 1, wherein the at least one navigation tool includes a time-based navigation tool, the selectable options being associated with time slots included in the program guide.

7. The system of claim 1, wherein the at least one navigation tool includes a calendar navigation tool, and the selection options include a plurality of selectable calendar day options.

8. The system of claim 7, wherein the selectable calendar day options are associated with time slots in the program guide.

9. The system of claim 1, wherein the media content processing subsystem is communicatively coupled to a media content provider, said media content processing subsystem being configured to receive data representative of the program guide from the media content provider.

10. The system of claim 1, further comprising a user input device configured to provide a user input signal to the media content processing subsystem, said user input device including a plurality of arrow buttons enabling the user to navigate the selectable options.

11. A method comprising:
providing a program guide graphical user interface to a display for presentation to a user, the program guide graphical user interface including a portion of a program guide, the program guide including a plurality of content channels and a plurality of time slots forming a matrix of cells, and a plurality of media content instances associated with the cells;
detecting an occurrence of a predetermined event;
providing, in response to the predetermined event, an overlaid navigation tool on the program guide graphical user interface, the navigation tool including a plurality of selectable options configured to jump a selector to a new location in the program guide, the plurality of selectable options including a plurality of content channel grouping options and where each of the content channel grouping options is associated with a pre-selected content channel included in a grouping of content channels included in the program guide;
detecting a user selection of one of the selectable options; and
initiating a jump to the new location in the underlying program guide based on a first selected option and a second selected option, where when a content channel grouping option is selected the first selected option is associated with a selected category and the second selected option is associated with a selected channel in the selected category.

12. The method of claim 11, further comprising updating the program guide graphical user interface to include another portion of the program guide, a first portion including the new location, in response to receiving the second selected option.

13. The method of claim 11, wherein the navigation tool includes a time-based navigation tool, the selectable options being associated with the time slots included in the program guide.

14. The method of claim 11, wherein the plurality of selectable options includes a plurality of individual content channel options.

15. The method of claim 11, wherein the navigation tool includes a calendar navigation tool, the selection options including a plurality of selectable calendar day options.

16. The method of claim 11, further comprising enabling the user to navigate the selectable options utilizing one or more arrow buttons of a user input device.

17. The method of claim 11, further comprising receiving data representative of the program guide from a media content provider.

18. A system comprising:
a media content processing subsystem configured to provide a program guide to a user, the program guide including a plurality of content channels, where said media content processing subsystem is further configured to:
present a plurality of selectable options overlaid on top of the program guide including a plurality of content channel grouping options where each of the content channel grouping options is associated with a pre-selected content channel included in a grouping of content channels included in the program guide,
change a focus of a selector to a new location in the program guide,
detect a user selection of one of the selectable options, and
navigate to the new location in the underlying program guide based on the user selection and when the user selection is a content channel grouping then the user selection includes changing the focus of the selector from one group of content channels to another group of content channels in response to receiving a first selected option and a second selected option, where the first selected option is associated with a selected category and the second selected option is associated with a selected channel in the selected category.

19. The system of claim 18, where the plurality of selectable options includes at least one presentation option.

20. The system of claim 18, wherein the media content processing subsystem is further configured to:
display the program guide graphical user interface on a first subset area of the display device in response to the selection of the at least one presentation option; and
display the media content instance on a second subset area of the display device concurrently with the program guide graphical user interface;
where the first and second subset areas of the display device occupy adjacent portions of the display device.

21. The system of claim 18, wherein the media content processing subsystem is further configured to:
provide the program guide graphical user interface to the display device in a substantially full-screen format;
receive a selection of the at least one presentation option, the presentation option being a picture-in-picture option;
provide the graphical user interface to a first subset area of the display device; and provide a media content instance to a second subset area of the display device.

* * * * *